(12) United States Patent
Yang et al.

(10) Patent No.: US 12,183,224 B2
(45) Date of Patent: Dec. 31, 2024

(54) DISPLAY MODULE AND METHOD FOR DRIVING SAME, AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Song Yang, Beijing (CN); Pengxia Liang, Beijing (CN); Ge Shi, Beijing (CN); Yujie Liu, Beijing (CN); Zheng Fang, Beijing (CN); Yanliu Sun, Beijing (CN); Jiahui Han, Beijing (CN); Qian Wu, Beijing (CN); Hongpeng Li, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/785,960

(22) PCT Filed: Jun. 30, 2021

(86) PCT No.: PCT/CN2021/103390
§ 371 (c)(1),
(2) Date: Jun. 16, 2022

(87) PCT Pub. No.: WO2023/272546
PCT Pub. Date: Jan. 5, 2023

(65) Prior Publication Data
US 2024/0169867 A1    May 23, 2024

(51) Int. Cl.
*G09G 3/00* (2006.01)
*G02F 1/1335* (2006.01)
(Continued)

(52) U.S. Cl.
CPC ....... *G09G 3/002* (2013.01); *G02F 1/133526* (2013.01); *G02F 1/133553* (2013.01);
(Continued)

(58) Field of Classification Search
None
See application file for complete search history.

(56) References Cited

U.S. PATENT DOCUMENTS 6,281,867 B1 * 8/2001 Kurematsu ....... G02F 1/134336
345/589
6,358,759 B1 * 3/2002 Hirabayashi ...... H01L 27/14609
438/69
(Continued)

FOREIGN PATENT DOCUMENTS

CN     1906525 A     1/2007
CN     101470309 A   7/2009
(Continued)

*Primary Examiner* — Dorothy Harris
(74) *Attorney, Agent, or Firm* — Lippes Mathias LLP

(57) ABSTRACT

Provided is a display module. The display module includes: a base substrate, and a plurality of pixel circuits arranged in an array, a plurality of pixel electrodes arranged in an array, a liquid crystal layer, and a light source that are disposed on a side of the base substrate and successively arranged along a direction away from the base substrate; wherein the pixel circuit at least comprises a drive transistor, the drive transistor comprising a gate electrode, a first electrode, and a second electrode; and the pixel electrode at least comprises a reflective electrode.

20 Claims, 15 Drawing Sheets

(51) Int. Cl.
*G02F 1/13363* (2006.01)
*G02F 1/1362* (2006.01)
*G09G 3/34* (2006.01)
*G09G 3/36* (2006.01)

(52) U.S. Cl.
CPC .. *G02F 1/133616* (2021.01); *G02F 1/136209* (2013.01); *G02F 1/136227* (2013.01); *G02F 1/136286* (2013.01); *G09G 3/3413* (2013.01); *G09G 3/3426* (2013.01); *G09G 3/3629* (2013.01); *G09G 3/3648* (2013.01); *G02F 1/133638* (2021.01); *G09G 2300/0426* (2013.01); *G09G 2300/0452* (2013.01); *G09G 2320/0233* (2013.01)

(56) References Cited

U.S. PATENT DOCUMENTS

| | | | | |
|---|---|---|---|---|
| 6,556,260 | B1* | 4/2003 | Itou | G02F 1/133603 349/113 |
| 6,753,839 | B2* | 6/2004 | Fujita | G09G 3/3659 345/100 |
| 6,781,647 | B2* | 8/2004 | Fujieda | G02F 1/133603 349/63 |
| 2001/0035924 | A1* | 11/2001 | Fujieda | G02F 1/133603 349/113 |
| 2002/0101398 | A1* | 8/2002 | Fujita | G09G 3/3659 345/98 |
| 2005/0275777 | A1* | 12/2005 | Oizumi | G02F 1/13378 349/114 |
| 2006/0262242 | A1* | 11/2006 | Koma | G02F 1/1336 349/69 |
| 2007/0070006 | A1* | 3/2007 | Katayama | G09G 3/3659 345/88 |
| 2008/0094700 | A1* | 4/2008 | Uehara | H04N 13/305 359/463 |
| 2009/0015751 | A1* | 1/2009 | Kim | G02F 1/133615 349/63 |
| 2014/0043680 | A1 | 2/2014 | Uehara et al. | |
| 2014/0286045 | A1 | 9/2014 | Pao et al. | |
| 2014/0293189 | A1 | 10/2014 | Fukunaga et al. | |
| 2015/0279332 | A1* | 10/2015 | Hu | G09G 3/003 348/51 |
| 2015/0362776 | A1* | 12/2015 | Jikumaru | H10K 50/865 349/12 |
| 2016/0282655 | A1 | 9/2016 | Yu | |
| 2016/0349439 | A1 | 12/2016 | Park et al. | |
| 2017/0068362 | A1* | 3/2017 | Den Boer | H01L 25/0753 |
| 2017/0315372 | A1 | 11/2017 | Bang et al. | |
| 2018/0005007 | A1 | 1/2018 | Du et al. | |
| 2018/0252932 | A1 | 9/2018 | Tan et al. | |
| 2019/0129244 | A1 | 5/2019 | Lu et al. | |
| 2020/0219906 | A1* | 7/2020 | Zheng | G02F 1/133345 |
| 2020/0264344 | A1 | 8/2020 | Chen et al. | |
| 2020/0264480 | A1 | 8/2020 | Yang et al. | |
| 2020/0348461 | A1 | 11/2020 | Meng et al. | |
| 2021/0011338 | A1* | 1/2021 | Wu | G02F 1/133553 |
| 2021/0202619 | A1* | 7/2021 | Hu | G02F 1/155 |
| 2022/0308390 | A1* | 9/2022 | Zhang | G02F 1/134309 |

FOREIGN PATENT DOCUMENTS

| | | |
|---|---|---|
| CN | 101907806 A | 12/2010 |
| CN | 102269893 A | 12/2011 |
| CN | 103943084 A | 7/2014 |
| CN | 104064118 A | 9/2014 |
| CN | 104076554 A | 10/2014 |
| CN | 104656320 A | 5/2015 |
| CN | 105607334 A | 5/2016 |
| CN | 106200114 A | 12/2016 |
| CN | 106873244 A | 6/2017 |
| CN | 107102470 A | 8/2017 |
| CN | 107133613 A | 9/2017 |
| CN | 206610052 U | 11/2017 |
| CN | 107454380 A | 12/2017 |
| CN | 108139591 A | 6/2018 |
| CN | 108267879 A | 7/2018 |
| CN | 108445558 A | 8/2018 |
| CN | 108919554 A | 11/2018 |
| CN | 109613747 A | 4/2019 |
| CN | 109765721 A | 5/2019 |
| CN | 110310962 A | 10/2019 |
| CN | 210720946 U | 6/2020 |
| CN | 111752052 A | 10/2020 |
| CN | 111796452 A | 10/2020 |
| CN | 111812766 A | 10/2020 |
| JP | 2000199899 A | 7/2000 |

\* cited by examiner

| For at least one target display partition in the plurality of display partitions, supplying the drive signal to the plurality of rows of the pixel circuit in the target display partition row-by-row | ~2301 | ns of the protrusions to a diameter of the ortho-

DISPLAY MODULE AND METHOD FOR DRIVING SAME, AND DISPLAY DEVICE

CROSS-REFERENCE TO RELATED APPLICATION

This application is a 371 of PCT application No. PCT/CN2021/103390, filed on Jun. 30, 2021, the content of which is herein incorporated by reference in its entirety.

TECHNICAL FIELD

The present disclosure relates to the field of display technologies, and in particular, relates to a display module, a method for driving the same, and a display device.

BACKGROUND

Light-field display devices are display devices that generate stereo vision images using the light-field display technology.

SUMMARY

Embodiments of the present disclosure provide a display module, a method for driving the same and a display device. The technical solutions are as follows.

In one aspect, a display module is provided. The display module includes:
a base substrate; and
a plurality of pixel circuits arranged in an array, a plurality of pixel electrodes arranged in an array, a liquid crystal layer, and a light source that are disposed on a side of the base substrate, and are successively arranged along a direction away from the base substrate; wherein the pixel circuit at least includes a drive transistor, the drive transistor including a gate electrode, a first electrode, and a second electrode; and the pixel electrode at least includes a reflective electrode;
wherein the plurality of pixel electrodes is electrically connected to the plurality of pixel circuits in one-to-one correspondence, and an orthographic projection of at least one of the pixel circuits on the base substrate is within in an orthographic projection of the corresponding pixel electrode on the base substrate; and the pixel electrode is configured to reflect light transmitted by the liquid crystal layer to the liquid crystal layer, such that the light is exited from a side, distal from the base substrate, of the liquid crystal layer.

Optionally, the gate electrode of the drive transistor is electrically connected to a gate line, the first electrode of the drive transistor is electrically connected to a data line, and the second electrode of the drive transistor is electrically connected to the pixel electrode; wherein the data line and the gate line are covered by the pixel electrode.

Optionally, the drive transistor in each of the plurality of pixel circuits disposed in the same column is electrically connected to two data lines, and the two data lines are covered by the pixel electrode.

Optionally, the pixel electrode further includes a transparent electrode disposed on a side, distal from the base substrate, of the reflective electrode; and the display module further includes:
a first planarization layer and a protrusion layer, disposed between the reflective electrode and the pixel electrode, and successively arranged along the direction away from the base substrate; and
a second planarization layer, disposed between the reflective electrode and the transparent electrode;
wherein a side, distal from the base substrate, of the protrusion layer is provided with a plurality of protrusions; and the reflective electrode is electrically connected to the pixel electrode by extending through the protrusion layer and a first via hole in the first planarization layer, and the reflective electrode is electrically connected to the transparent electrode by extending through a second via hole of the second planarization layer.

Optionally, the first via hole and the second via hole are spaced apart, and an orthographic projection of the first via hole on the base substrate is not overlapped with an orthographic projection of the second via hole on the base substrate.

Optionally, a protrusive direction of the protrusion is the direction away from the base substrate, and a section of the protrusion perpendicular to the base substrate is arc-shaped, and orthographic projections of the plurality of protrusions on the base substrate are overlapped with the orthographic projection of one of the pixel circuits on the base substrate.

Optionally, a slope angle of the protrusion is greater than or equal to 30 degrees and less than or equal to 60 degrees; and
the ratio of a spacing between each two adjacent protrusions of the protrusions to a diameter of the orthographic projection of each of the protrusions in each two adjacent protrusions of the protrusions on the base substrate is less than or equal to 1.

Optionally, the plurality of protrusions are arranged in an array; or
the plurality of protrusions include a plurality of protrusion groups arranged in a first direction, each of the protrusion groups including at least two of the protrusions arranged in a second direction, wherein an included angle between the second direction and the first direction is an acute included angle.

Optionally, a material of the protrusion layer includes a resin; a material of the reflective electrode includes a silver metal; a material of the transparent electrode includes an indium tin oxide; and
a surface morphology of the side, distal from the base substrate, of the reflective electrode is consistent with a surface morphology of the side, distal from the base substrate, of the protrusion layer; and
the reflective electrode includes a plurality of reflective electrode blocks that are insulatively arranged, wherein one of the pixel circuits is correspondingly covered by each of the reflective electrode blocks.

Optionally, the liquid crystal layer includes: a first alignment layer, a liquid crystal molecule, and a second alignment layer that are successively arranged along the direction away from the base substrate; and
a support layer disposed between the first alignment layer and the second alignment layer, wherein a thickness of the support layer is greater than or equal to 1 μm and less than or equal to 2 μm.

Optionally, the liquid crystal layer further includes: a common electrode, a third planarization layer, a first black matrix layer, a packaging cover plate, and a composite optical film that are disposed on a side, distal from the base substrate, of the second alignment layer, and are successively arranged along the direction away from the base substrate;

wherein an orthographic projection of the support layer on the base substrate is covered by an orthographic projection of the first black matrix layer on the base substrate.

Optionally, the composite optical film includes: a linear polarizer, a quarter-wave plate, and a half-wave plate;
  wherein an included angle $\theta_{pol}$ between a light absorption axis of the linear polarizer and a target axis, an included angle $\theta_{1/2}$ between a slow axis of the quarter-wave plate and the target axis, and an included angle $\theta_{1/4}$ between a slow axis of the half-wave plate and the target axis satisfy: $\theta_{pol}-2\theta_{1/2}+\theta_{1/4}=45$ degrees.

Optionally, the light source is a direct-type light source, the direct-type light source including: a filling layer, a plurality of light-emitting units, and a plurality of second black matrix layers that are successively arranged along the direction away from the base substrate;
  wherein an orthographic projection of one of the second black matrix layers on the base substrate is overlapped with an orthographic projection of one of the light-emitting units on the base substrate.

Optionally, a pixel is formed by each of the pixel electrodes and the common electrode in the liquid crystal layer; and
  each of the light-emitting units includes a plurality of light-emitting diodes, an orthographic projection of one of the light emitting diodes on the base substrate being overlapped with the orthographic projections of the plurality of pixels on the base substrate.

Optionally, the orthographic projection of one of the light-emitting diodes on the base substrate is overlapped with the orthographic projections of 5 rows and 5 columns of the pixels on the base substrate.

Optionally, each of the light-emitting units includes a red light-emitting diode, a blue light-emitting diode, and a green light-emitting diode; wherein
  the red light-emitting diode, the blue light-emitting diode, and the green light-emitting diode in each of the light-emitting units are arranged in a row direction; or
  the red light-emitting diode, the blue light-emitting diode, and the green light-emitting diode in each of the light-emitting units are arranged in a triangle; or
  each of the light-emitting units includes two green light-emitting diodes, and the red light-emitting diode, the blue light-emitting diode, and the two green light-emitting diodes are arranged in a rectangle.

Optionally, the display module further includes a plurality of lenses disposed on a side, distal from the base substrate, of the light source, and arranged in an array; wherein
  an orthographic projection of one of the lenses on the base substrate is overlapped with orthographic projections of a plurality of pixels in the display module on the base substrate, and the lens is configured to transmit the light.

Optionally, the reflective electrode is disposed in a focal plane of the plurality of lenses arranged in an array.

Optionally, a focal length of the lens is greater than or equal to 2 μm and less than or equal to 10 μm; and
  a pore size of the lens is greater or equal to 0.5 μm and less than or equal to 1 μm.

Optionally, the display module further includes a light diffusion layer disposed between the liquid crystal layer and the light source.

In another aspect, a method for driving a display module is provided, wherein the display module includes a plurality of display partitions successively arranged in a column direction, each of display partitions including a plurality of rows of the pixel circuits; the method including:
  supplying a drive signal to the plurality of rows of the pixel circuits in the target display partition row by row for at least one target display partition of the plurality of display partitions, wherein the drive signal is configured for the pixel circuits to load a drive voltage to the pixel electrode.

Optionally, the numbers of rows of the pixel circuits in the display partitions are equal, and stages of supplying the drive signal to the pixel circuits in the target display partitions are overlapped.

In still another aspect, a display device is provided, wherein the display device is a near-eye light filed display device, wherein the near-eye light filed display device includes the display module as defined in the above aspects.

BRIEF DESCRIPTION OF THE DRAWINGS

For clearer descriptions of the technical solutions in embodiments of the present disclosure, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

Figure 1:
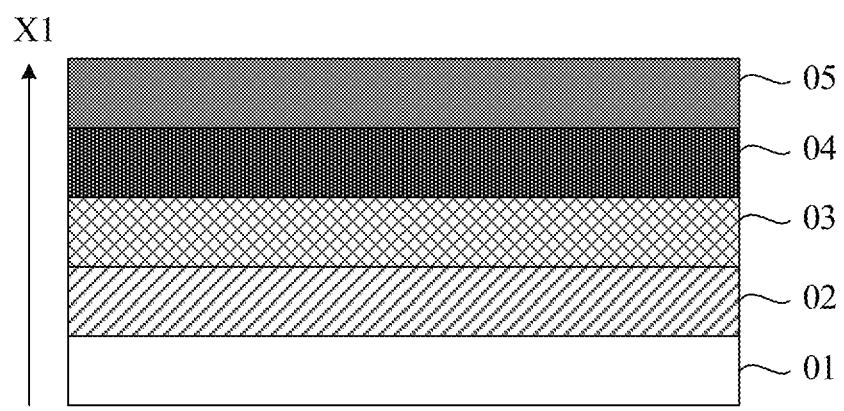
FIG. 1 is a schematic structural diagram of a display module according to an embodiment of the present disclosure.

The present disclosure is described in further detail with reference to the enclosed drawings, to clearly present the objects, technical solutions, and advantages of the present disclosure.

The terms used in the detailed description of the present disclosure are merely for interpreting, instead of limiting, the embodiments of the present disclosure. It should be noted that unless otherwise defined, technical or scientific terms used in the embodiments of the present disclosure shall have ordinary meanings understandable by persons of ordinary skill in the art to which the disclosure belongs. The terms "first," "second," and the like used in the embodiments of the present disclosure are not intended to indicate any order, quantity or importance, but are merely used to distinguish the different components. The terms "comprise," "include," and derivatives or variations thereof are used to indicate that the element or object preceding the terms covers the element or object following the terms and its equivalents, and shall not be understood as excluding other elements or objects. The terms "connect," "contact," and the like are not intended to be limited to physical or mechanical connections, but may include electrical connections, either direct or indirect connection. The terms "on," "under," "left," and "right" are only used to indicate the relative positional relationship. When the absolute position of the described object changes, the relative positional relationship may change accordingly. The term "and/or" mentioned in the embodiments of the present disclosure indicates three relationships between contextual objects. For example, A and/or B may mean that A exists alone, A and B exist at the same time, and B exists alone. The symbol "/" generally denotes an "OR" relationship between contextual objects.

In the related art, most of display modules in the light-field display devices are transmissive display modules. The transmissive display module generally includes a base substrate provided with an opening region and a non-opening region, a pixel circuit disposed in the non-opening region, a pixel electrode disposed in the opening region, and a light source and a liquid crystal layer disposed on a side of the base substrate. The pixel electrode is capable of controlling deflections of liquid crystal molecules in the liquid crystal layer driven by the pixel circuit. Upon occurrence of the deflections of the liquid crystal molecules, light emitted by the light source may be irradiated through the liquid crystal layer via the opening region, such that display is achieved.

However, because it is necessary to arrange the non-opening region separately to configure the pixel circuit, resolution of the transmissive type display module is generally low. The resolution may be denoted by pixel per inch (PPI). The display module with low PPI is prone to a screen window effect in case of displaying a picture, and the screen window effect refers to a phenomenon that a dancing of thin lines and a separate flicker of a high-contrast edge caused by real-time rendering in case that the number of the pixels is insufficient. Such that a display effect is poor. In addition, because the non-opening region is non-opaque, an aperture ratio of the transmissive type display module is low. Correspondingly, a light utilization ratio (that is, a light efficiency) of the transmissive type display module is low, generally only reaching 33%, and the display effect is poor.

Embodiments of the present disclosure provide a display module. The display module is applicable to a near-eye light filed display device. The display module is designed to not only have a high resolution but also have a high light utilization ratio, such that an overall display effect is great.

FIG. 1 is a schematic structural diagram of a display module according to an embodiment of the present disclosure. As shown in FIG. 1, the display module includes: a base substrate 01, a plurality of pixel circuits 02 arranged in an array, a plurality of pixel electrodes 03 arranged in an array, a liquid crystal layer 04, and a light source 05 that are disposed on a side of the base substrate 01, and are successively arranged along a direction X1 away from the base substrate 01. FIG. 1 merely schematically shows one of the pixel circuits 02 and one of the pixel electrodes 03.

Figure 2:
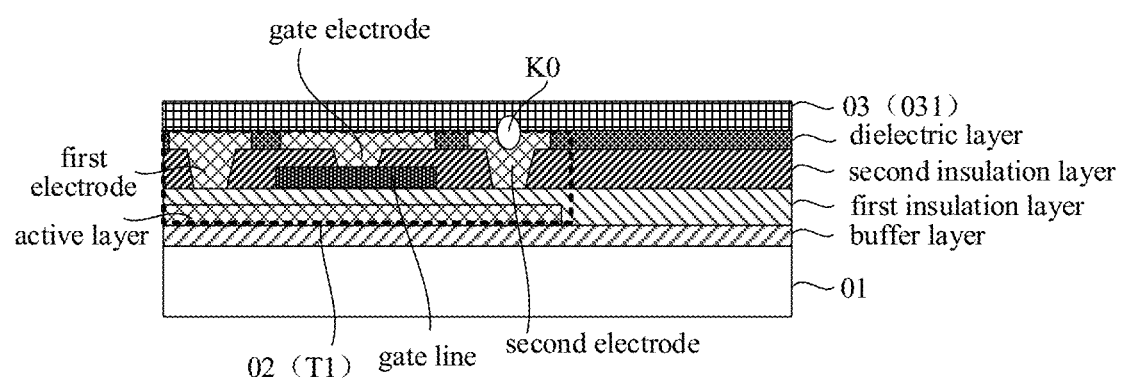
FIG. 2 is a schematic local structural diagram of a display module according to an embodiment of the present disclosure.

FIG. 2 is a schematic structural diagram of another display module according to an embodiment of the present disclosure. As shown in FIG. 2, the pixel circuit 02 at least includes a drive transistor T1, and the drive transistor T1 may include a gate electrode, a first electrode, and a second electrode. The first electrode may be referred to as a source electrode, correspondingly, the second electrode may be referred to as a drain electrode. Optionally, the first electrode may be referred to as the drain electrode, and correspondingly, the second electrode may be referred to as the source electrode. The pixel electrode 03 at least includes a reflective electrode 031.

The plurality of pixel electrodes 03 may be electrically connected to the plurality of pixel circuits 02 in one-to-one correspondence. That is, each of the pixel electrodes 03 may be electrically connected to one of the pixel circuits 02, and different pixel electrodes 03 are connected to different pixel circuits 02. Moreover, an orthographic projection of at least one of the pixel circuits 02 on the base substrate 01 may be within an orthographic projection of a corresponding pixel electrode 03 on the base substrate 01. That is, the regions of the pixel electrode 03 and the pixel circuit 02 may be overlapped. In this way, the resolution of the display module of the embodiments of the present disclosure may be high, compared with the transmissive type display module requiring to reserve the non-opening region separately to configure the pixel circuit 02. Furthermore, the screen window effect phenomenon may be effectively avoided in case of displaying the picture, such that the display effect is great.

In the embodiments of the present disclosure, the light source 05 may be configured to emit light to the liquid crystal layer 04. The pixel electrode 03 may be configured to reflect the light transmitted by the liquid crystal layer 04 to the liquid crystal layer 04, such that the light is exited from a side, distal from the base substrate 01, of the liquid crystal layer 04. That is, the light emitted by the light source 05 may be first irradiated to the pixel electrode 03 through the liquid crystal layer 04, and then reflected by the pixel electrode 03 and passed through the liquid crystal layer 04 again, and transmitted from the side away from the base substrate 01, such that an effective display is achieved. In other words, the side distal from the base substrate 01 is a display side. Based on this, the light source 05 may also be referred to as a front light unit (FLU).

Based on a display principle according to the above embodiments of the present disclosure, the region where the pixel electrode 03 disposed may be the opening region which may be configured to display images. In this way, the light utilization ratio is effectively improved, and the great display effect is further ensured.

In summary, the embodiments of the present disclosure provide a display module. The display module includes the pixel electrode at least provided with the reflective electrode, and the reflective electrode may reflect the light transmitted by the liquid crystal layer to the liquid crystal layer driven by the pixel circuit, such that the light is exited via the liquid crystal layer, and a normal display of the display module is ensured. Moreover, the pixel circuit is covered by the pixel electrode, that is, the region where the pixel electrode is disposed may be overlapped with the region where the pixel circuit is disposed. In this way, compared with the transmissive type display module, the resolution of the display module may be effectively improved because it is not necessary to separately reserve the region to specially arrange the pixel circuit.

In an optional embodiment, referring to FIG. 2, the pixel electrode 03 and the reflective electrode 031 may be reconfigured. That is, the reflective electrode 031 may be directly configured as the pixel electrode 03. Based on this, the pixel electrode 03 may directly control deflections of liquid crystal molecules in the liquid crystal layer 04 driven by the pixel circuit 02, such that the light emitted by the light source 05 may be transmitted via the liquid crystal layer 04 to the pixel electrode 03. Then, the pixel electrode 03 may further reflect the light transmitted from the liquid crystal layer 04 to the liquid crystal layer 04, such that the light is exited from the side, distal from the base substrate 01, of the liquid crystal layer 04. That is, the pixel electrode 03 may not only reflect the light emitted by the light source 05, but also directly drive the deflections of the liquid crystal molecules to modulate the light.

To be specific, the liquid crystal layer 04 may further include a common electrode. The pixel circuit 02 may transmit a drive voltage to the pixel electrode 03, and a voltage difference may be present between the drive voltage and a voltage loaded to the common electrode, such that the liquid crystal molecules may be deflected under the voltage difference.

Still referring to FIG. 2, based on the structure, the pixel electrode 03 may be electrically connected to the drive transistor T1 of the corresponding pixel circuit 02 through a via hole K0. For example, the second electrode of the drive transistor T1 may be connected to the pixel electrode 03 via the via hole K0.

Figure 3:
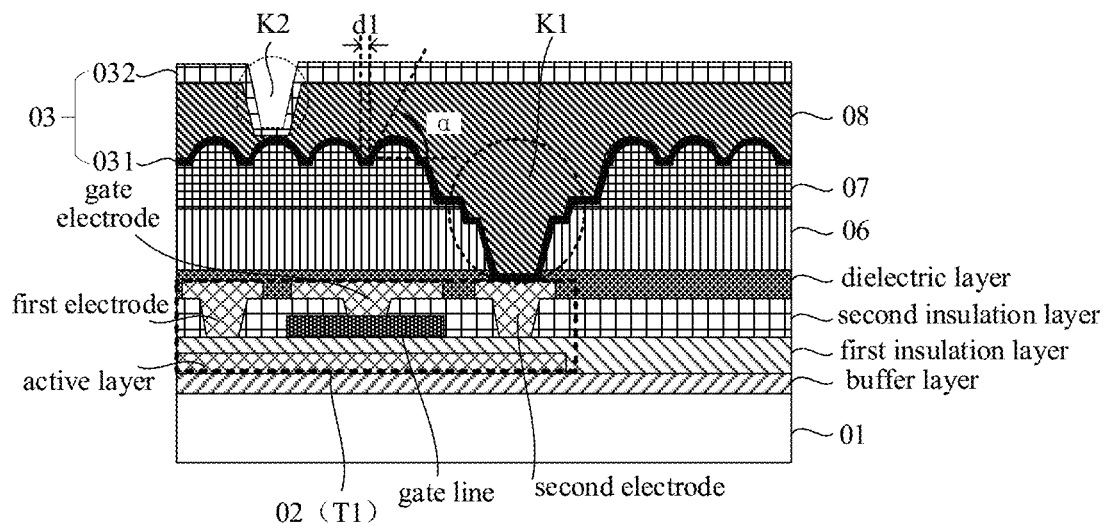
FIG. 3 is a schematic local structural diagram of another display module according to an embodiment of the present disclosure.

In another optional embodiment, referring to FIG. 3, the display module may further include: a first planarization layer 06 and a protrusion layer 07 that are disposed between the pixel electrode 03 and the pixel circuit 02.

The first planarization layer 06 may be configured to planarize a hierarchical structure in the pixel circuit 02, which prevents an offset from being formed. A plurality of protrusions may be disposed on a side, distal from the base substrate 01, of the protrusion layer 07, that is, a surface of the protrusion layer 07. The protrusion layer 07 may be employed to configure a side, distal from the base substrate 01, of the pixel electrode 03. That is, the protrusion layer 07 may be configured as a configuration layer of the pixel electrode 03, such that a morphology of a surface, distal from the base substrate 01, of the pixel electrode 03 is consistent with a morphology of a surface, distal from the base substrate 01, of the protrusion layer 07. In this way, referring to FIG. 3, the pixel electrode 03 is also provided with a plurality of protrusions.

It should be noted that the protrusion layer 07 may be a contiguous whole layer, and the pixel electrode 03 may include a plurality of reflective electrode blocks disposed insulated from each other, and each of the plurality of reflective electrode blocks may cover one of the pixel circuits 02 correspondingly.

Optionally, a protrusive direction of the protrusion may be the direction X1 away from the base substrate 01, a section of the protrusion perpendicular to the base substrate 01 may be in an arc shown in FIG. 3, and correspondingly, an orthographic projection of each of the protrusions on the base substrate 01 may be circular.

Figure 4:
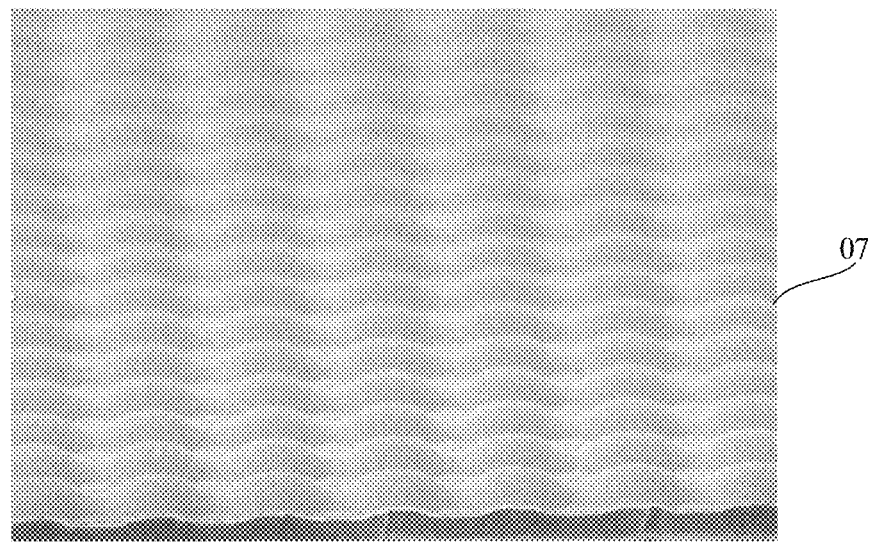
FIG. 4 is an equivalent diagram of a protrusion layer according to an embodiment of the present disclosure.

For example, referring to an equivalent diagram of a protrusion layer 07 shown in FIG. 4, an outer surface of each of the protrusions may include a part of a spherical surface, for example, a hemispherical surface. In some embodiments, each of the protrusions also may be other shapes, for example, ⅓ of a complete sphere.

Optionally, referring to FIG. 3, a slope angle α of the protrusion may be greater than or equal to 30 degrees and less than or equal to 60 degrees, and a ratio (d1/R) of a spacing d1 between each two adjacent protrusions of the protrusions to a diameter R of an orthographic projection of each protrusion in each two adjacent protrusions of the protrusions on the base substrate 01 may be less than or equal to 1. For example, the spacing d1 between each two adjacent protrusions of the protrusions may be greater than or equal to 0.5 μm and less than or equal to 20 μm. The diameter R of the orthographic projection of each of the protrusions on the base substrate 01 also may be greater than or equal to 0.5 μm and less than or equal to 20 μm. In some embodiments, no spacing is present between each two adjacent protrusions of the protrusions.

In addition, in the embodiments of the present disclosure, the orthographic projections of the plurality of protrusions on the base substrate 01 are overlapped with an orthographic projection of one of the pixel circuits 02 on the base substrate 01.

For example, on the premise that the pixel circuit 02 and the plurality of protrusions are arranged on the base substrate 01 in an array, the orthographic projection of one of the pixel circuits 02 on the base substrate 01 may be overlapped with the orthographic projections of 5*5 protrusions to 10*10 protrusions on the base substrate 01. 5*5 represents 5 rows and 5 columns of protrusions, and 10*10 represents 10 rows and 10 columns of protrusions.

By configuring the protrusion layer 07 with the plurality of protrusions, a reflective angle of the pixel electrode 03 for reflecting the light may be increased, such that a reflective angle of the light reliably ranges from 0 to 90 degrees. Moreover, a mixed light effect may be achieved, such that a good display effect is ensured. In addition, by regulating the slope angle α of each of the protrusions and the spacing d1 between each two adjacent protrusions of the protrusions, a uniform reflective effect is achieved, which further ensures the good display effect.

Optionally, in the embodiments of the present disclosure, the display effect may be improved by regulating an arrangement of the plurality of protrusions. The arrangement may be implemented by a mask process.

Figure 5:
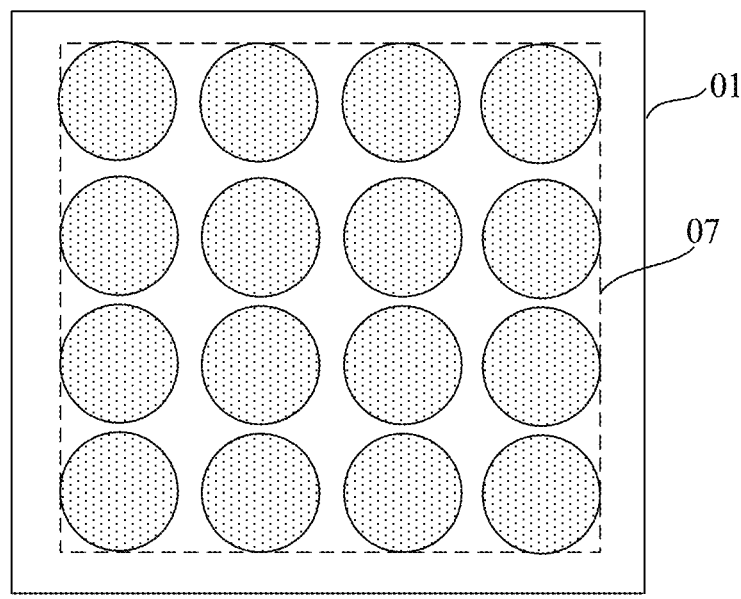
FIG. 5 is a schematic arrangement diagram of a plurality of protrusions according to an embodiment of the present disclosure.

For example, FIG. 5 is a top view of the structure shown in FIG. 3. Referring to FIG. 5, the plurality of protrusions in the protrusion layer 07 may be arranged in an array, that is, the orthographic projections of the plurality of protrusions on the base substrate 01 may be regularly arranged in rows and columns.

Figure 6:
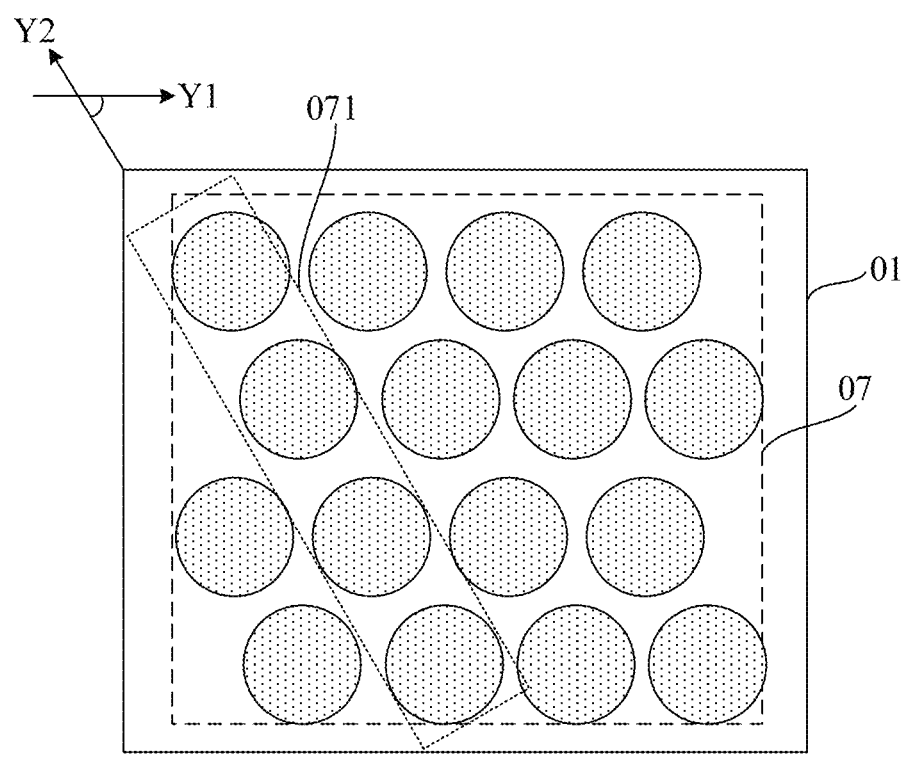
FIG. 6 is another schematic arrangement diagram of a plurality of protrusions according to embodiment of the present disclosure.

Optionally, for example, FIG. 6 is another top view of the structure shown in FIG. 2. Referring to FIG. 6, the plurality of protrusions in the protrusion layer 07 may include a plurality of protrusion groups 071 arranged along s first direction Y1, and each of the protrusion groups 071 may include at least two protrusions arranged along a second direction Y2. An included angle between the second direction Y2 and the first direction Y1 may be an acute included angle, that is, the second direction Y2 is neither perpendicular nor parallel to the first direction Y1. The arrangement may also be referred to as interlaced arrangement. Based on this, for the arrangement shown in FIG. 5, in the case that the arrangement is limited by the first direction Y1 and the second direction Y2, the first direction Y1 and the second direction Y2 in FIG. 5 are perpendicular to each other.

Because uniformity of an electrical filed formed on the pixel electrode 03 with the protrusions (i.e., sags and crests) is limited, further referring to FIG. 3, the pixel electrode 03 may include a transparent electrode 032 in addition to the reflective electrode 031. Based on this, the display module may further include a second planarization layer 08.

The reflective electrode 031 may be disposed on the side, distal from the base substrate 01, of the protrusion layer 07, and the second planarization layer 08 and the transparent electrode 032 are successively disposed on a side, distal from the base substrate 01, of the reflective electrode 031. That is, the protrusion layer 07 is actually employed to configure the reflective electrode 031 in the pixel electrode 03.

The second planarization layer 08 may be disposed between the reflective electrode 031 and the transparent electrode 032, and the second planarization layer 08 may be configured to planarize protrusions on an upper surface, distal from the base substrate 01, of the reflective electrode 031. In this way, regular arrangement of the liquid crystal molecules is facilitated.

Figure 7:
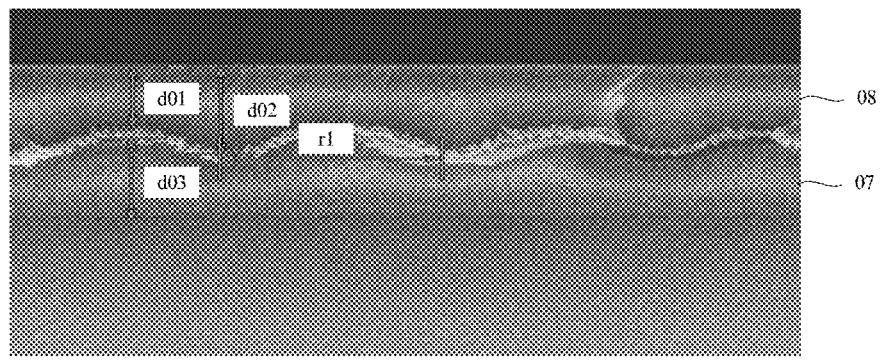
FIG. 7 is a schematic local equivalent diagram of a display module according to an embodiment of the present disclosure.

Optionally, a planarization effect of the second planarization layer 08 on the reflective electrode 031 may refer to an equivalent diagram shown in FIG. 7. A minimum distance d01 between a side, distal from the base substrate 01, of the transparent electrode 032 and an upper surface of the protrusion layer 07 may range from 2 μm to 2.5 μm, and a maximum distance d02 between the side, distal from the base substrate 01, of the transparent electrode 032 and the upper surface of the protrusion layer 07 may be form 3 μm to 3.5 μm, and a distance d03 between the upper surface and a lower surface of the protrusion layer 07 may range from 2.5 μm to 3 μm, and a diameter r1 of one of the protrusions may range from 5 μm to 5.5 μm.

Still referring to FIG. 3, on the premise that the pixel electrode 03 includes the reflective electrode 031 and the transparent electrode 032, the reflective electrode 031 may be electrically connected to the pixel circuit 02 by extending through the protrusion layer 07 and a first via hole K1 of the first planarization layer 06, and the reflective electrode 031 may be electrically connected to the transparent electrode 032 by extending through a second via hole K2 of the second planarization layer 08. That is, the pixel electrode 03 including the reflective electrode 031 and the transparent electrode 032 may be electrically connected to the pixel circuit 02 by the reflective electrode 031. Based on this connection mode, on the premise that the pixel electrode 03 includes the reflective electrode 031 and the transparent electrode 032, the pixel circuit 02 actually loads the drive voltage directly to the reflective electrode 031, and then the drive voltage is transferred to the transparent electrode 032 by the reflective electrode 031, such that the deflections of the liquid crystal molecules in the liquid crystal layer 04 are controlled by the transparent electrode 032 based on the drive voltage.

Optionally, an overlap region may be present between an orthographic projection of the transparent electrode 032 on the base substrate 01 and an orthographic projection of the reflective electrode 031 on the base substrate 01. For example, referring to FIG. 3, the orthographic projection of the transparent electrode 032 on the base substrate 01 is coincident with the orthographic projection of the reflective electrode 031 on the base substrate 01.

Optionally, still referring to FIG. 3, an orthographic projection of the first via hole K1 on the base substrate 01 and an orthographic projection of the second via hole K2 on the base substrate 01 are both within the overlap region according to the above embodiments. Moreover, the first via hole K1 and the second via hole K2 may be spaced apart, and the orthographic projection of the first via hole K1 on the base substrate 01 is not overlapped with the orthographic projection of the second via hole K2 on the base substrate 01.

Optionally, the reflective electrode 031 may be made of an opaque material with a reflective function. For example, the reflective electrode 031 may be made of silver (Ag), and the silver may be plated on a surface of the side, distal from the base substrate 01, of the protrusion layer 07 to form the reflective electrode 031. Based on the plating process, it may be further determined that a morphology of a surface, distal from the base substrate 01, of the reflective electrode 031 formed according to the embodiments of the present disclosure is consistent with the morphology of the surface, distal from the base substrate 01, of the protrusion layer 07. The transparent electrode 032 may be made of a transparent conductive material. For example, the transparent conductive material may be an indium tin oxide (ITO). The protrusion layer 07 may be made of a resin.

Optionally, still referring to FIG. 2 and FIG. 3, the display module may further include: an active layer, a buffer layer, a first insulation layer, a second insulation layer, and a dielectric layer.

The buffer layer, the active layer, the first insulation layer, the second insulation layer, the gate electrode, and the dielectric layer may be successively arranged along the direction X1 away from the base substrate 01, and the first electrode, the second electrode, and the gate electrode of the drive transistor T1 may be disposed in the same layer. The first electrode and the second electrode may be electrically connected to the active layer by extending through via holes of the first insulation layer and the second insulation layer. The buffer layer may be configured to planarize the base substrate 01, which facilitates arrangement of each film layer in the pixel circuit 02. The first insulation layer and the second insulation layer may be configured to prevent signals from causing interference between adjacent metal layers. The dielectric layer may be configured to protect the pixel circuit 02.

The pixel circuit 02 of the structures shown in FIG. 2 and FIG. 3 may be referred to as a pixel circuit of a top gate structure. In some embodiments, the pixel circuit may also be a bottom gate structure.

Figure 8:
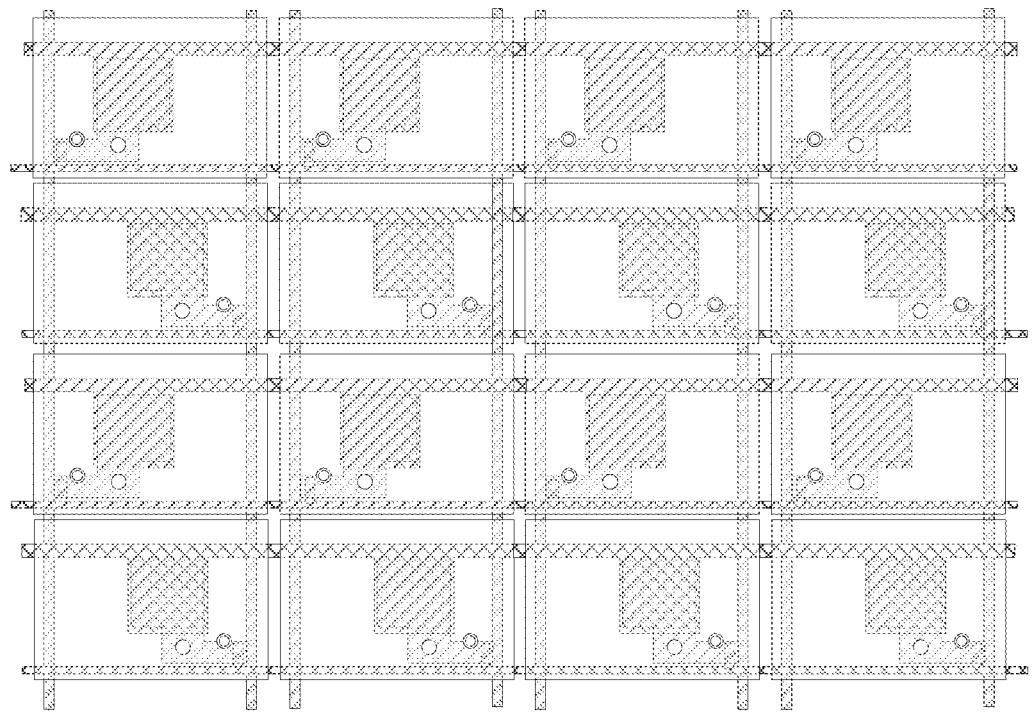
FIG. 8 is a schematic equivalent diagram of a pixel circuit and a pixel according to an embodiment of the present disclosure.
Figure 9:
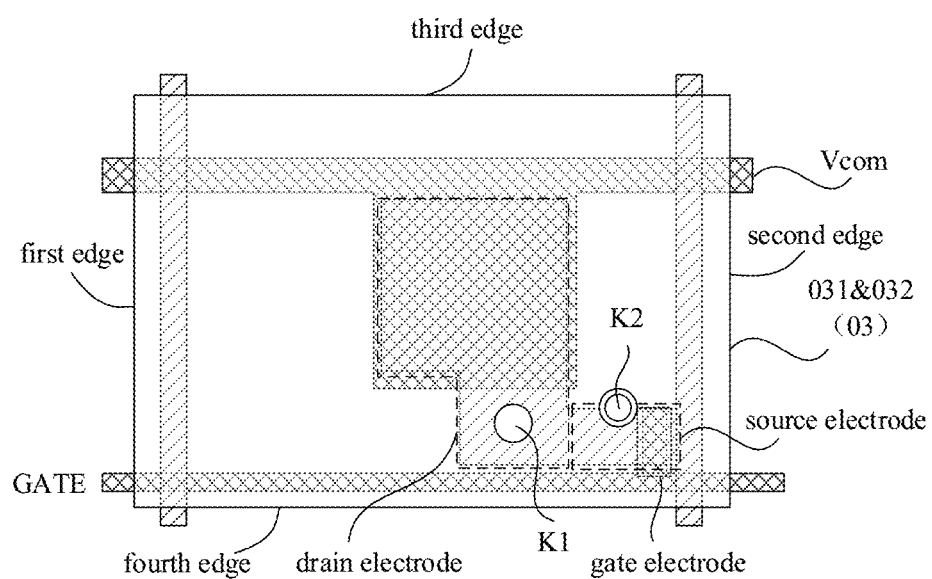
FIG. 9 is a schematic local amplification diagram of a structure shown in FIG. 8.

Description is given using a scenario where in the display module shown in FIG. 3, the first electrode is the source electrode and the second electrode is the drain electrode as an example. FIG. 8 is an equivalent diagram of the base substrate 01 including a plurality of pixel circuits 02. FIG. 9 is a partially enlarged diagram of a region where one of the pixel circuits in the structure shown in FIG. 8 is disposed.

Referring to FIG. 2, FIG. 3 and FIG. 9 all together, the gate electrode of each of the drive transistor T1 may be electrically connected to a gate line GATE, and the source electrode of the drive transistor T1 may be electrically connected to a data line DATA, and the drain electrode of the drive transistor T1 may be electrically connected to the pixel electrode 03. For the structure shown in FIG. 3, the drain electrode of the drive transistor T1 is actually electrically connected to the reflective electrode 031. In addition, FIG. 8 and FIG. 9 further show a common electrode Vcom. One pixel may be formed by one of the pixel electrodes 03 electrically connected to the pixel circuits 02 and the common electrode Vcom above the pixel electrode 03.

Optionally, in each of the pixel electrodes 03 according to the embodiments of the present disclosure, the orthographic projection of the reflective electrode 031 on the base substrate 01 may be overlapped with the orthographic projection of the transparent electrode 032 on the base substrate 01. For example, referring to FIG. 9, the orthographic projection of the reflective electrode 031 on the base substrate 01 is coincident (i.e., the same size) with the orthographic projection of the transparent electrode 032 on the base substrate 01, and the reflective electrode 031 is electrically connected to the transparent electrode 032 via the second via hole K2. In addition, the reflective electrode 031 is also electrically connected to the drain electrode of the drive transistor T1 via the first via hole K1.

Optionally, in the embodiments of the present disclosure, for each of the pixels, an orthographic projection of the common electrode Vcom forming the pixel on the base substrate 01 may be overlapped with an orthographic projection of the pixel electrode 03 forming the pixel on the base substrate 01, wherein the overlap is configured to for the pixel. For example, referring to FIG. 9, the orthographic projection of each of the pixel electrodes 03 on the base substrate 01 is overlapped with the orthographic projection of the corresponding common electrode Vcom on the base substrate 01. Each of the pixel electrodes 03 is rectangular, and the common electrode Vcom covered by each of the pixel electrodes 03 is T-shaped. In some embodiments, the common electrode Vcom may also be other shapes, for example, a rectangular shape.

Optionally, in the embodiments of the present disclosure, the common electrode Vcom that forms each of the pixels may be an integrated structure.

For each of the drive transistor T1, when the gate line GATE supplies a gate drive signal of an active potential to the gate electrode of the drive transistor T1, the source electrode of the drive transistor T1 may be conductively connected to the drain electrode of the drive transistor T1, that is the drive transistor T1 may be opened. In this case, a data signal written by the data line DATA to the source electrode may be further transmitted to the drain electrode, and because the drain electrode is electrically connected to pixel electrode 03, the data signal may be written in the pixel electrode 03. In other words, the data signal supplied by the data line DATA may be transmitted to the pixel electrode 03 via the opening drive transistor T1. The data signal is the drive voltage according to the above embodiments.

Referring to the structures shown in FIG. 2, FIG. 3, FIG. 8, and FIG. 9 all together, the orthographic projection of at least one of the pixel circuits 02 on the base substrate 01 is within the orthographic projection of the corresponding pixel electrode 03 on the base substrate 01, that is, the pixel electrode 03 covering the pixel circuit 02 may mean that: the pixel electrode 03 covers at least two signal lines electrically connected to the pixel circuit 02 electrically connected to the pixel electrode 03. In other words, the at least two signal lines electrically connected to the pixel circuit 02 may be hidden under the pixel electrode 03. In this way, a disadvantage that the traditional transmissive type display module must avoid wiring in the opening region may be avoided, and the aperture ratio is further improved. According to a test, the aperture ratio of the display module according to the embodiments of the present disclosure may reach 85%-90%.

It should be noted that, the pixel electrode 03 covering the at least two signal lines electrically connected to the pixel circuits may mean that: the orthographic projection of the pixel electrode 03 on the base substrate 01 is overlapped with an orthographic projection of the at least two signal lines on the base substrate 01. The overlap may refer to a complete overlap or a partial overlap. For example, referring to FIG. 9, a part of the signal lines disposed between each two adjacent pixel electrodes of the pixel electrodes 03 may not be covered by the pixel electrode 03.

Optionally, referring to FIG. 9, the at least two signal lines may include at least one of the gate lines GATE and at least one of the data lines DATA. Each of the data lines DATA may extend along a column direction of the pixel circuit 02, and each of the gate lines GATE may extend along a row direction of the pixel circuit 02. Each of the pixel electrodes 03 may include opposite first and second edges along a row direction, and may include opposite third and fourth edges along a row direction.

Based on this, the pixel electrode 03 covering the data line DATA may mean that: an orthographic projection of a part of the data line DATA between the first edge and the second edge of the pixel electrode 03 on the base substrate 01 is within the orthographic projection of the pixel electrode 03 on the base substrate 01. Similarly, the pixel electrode 03 covering the gate line GATE may mean that: an orthographic projection of a part of the gate line GATE between the third edge and the fourth edge of the pixel electrode 03 on the base substrate 01 is within the orthographic projection of the pixel electrode 03 on the base substrate 01.

To be specific, in the embodiments of the present disclosure, one of the data lines DATA and one of the gate lines GATE electrically connected to the drive transistor T1 in one of the pixel circuits 02 which is electrically connected to each of the pixel electrodes 03 may covered by the pixel electrode 03.

Optionally, in the embodiments of the present disclosure, referring to FIG. 9, the drive transistor T1 in each of the pixel circuits 02 disposed in the same column may be electrically connected to two data lines DATA. For example, each of the pixel circuits 02 disposed in odd rows may be electrically connected to one of the two data lines DATA, and each of the pixel circuits 02 disposed in even rows may be electrically connected to the other of the two data lines DATA. The two data lines DATA may be respectively disposed on left and right sides of one column of the corresponding pixel circuits 02. Based on this, each of the pixel electrodes 03 may cover the two data lines DATA. That is, the two data lines DATA disposed on the left and right sides of one column of the pixel circuits 02 may be both covered by the pixel electrode 03.

Assuming that for each of the pixel circuits 02, the data line DATA on the left side of the pixel circuit 02 is referred to as a first data line, and the data line DATA on the right side of the pixel circuit 02 is referred to as a second data line, then the first data line and the second data line both being covered by the corresponding pixel electrode 03 may mean that: an orthographic projection of a part of the first data line between the first edge and the second edge of the pixel electrode 03 on the base substrate 01 is within the orthographic projection of the pixel electrode 03 on the base substrate 01, and an orthographic projection of a part of the second data line between the first edge and the second edge of the pixel electrode 03 on the base substrate 01 is also disposed in the an orthographic projection of the pixel electrode 03 on the base substrate 01.

Optionally, a material of the drive transistor T1 according to the embodiments of the present disclosure may be any one of following materials: an amorphous silicon (aSi), a low temperature poly-silicon (LTPS), a low temperature polycrystalline oxide (LTPO), and an oxide.

Figure 10:
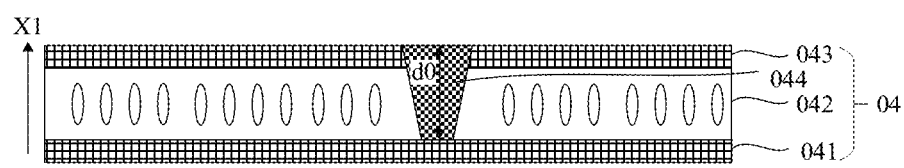
FIG. 10 is a schematic structural diagram of a liquid crystal layer according to an embodiment of the present disclosure.

Optionally, FIG. 10 is a schematic structural diagram of a liquid crystal layer according to an embodiment of the present disclosure. As shown in FIG. 10, the liquid crystal layer 04 may include: a first alignment layer 041, the liquid crystal molecule 042, and a second alignment layer 043 that are successively arranged along the direction X1 away from the base substrate 01. A support layer 044 is disposed between the first alignment layer 041 and the second alignment layer 043.

The first alignment layer 041 and the second alignment layer 043 may be configured as an alignment direction of the liquid crystal molecule 042. Optionally, the alignment direction of the liquid crystal molecule 042 may be regulated by defining a rubbing direction of the first alignment layer 041 and a rubbing direction of the second alignment layer 043.

Optionally, referring to FIG. 10, a thickness do of the support layer 044 according to the embodiments of the present disclosure may greater than or equal to 1 μm and less than or equal to 2 μm, such that a whole thickness of the liquid crystal layer 04 ranges from 1 μm to 2 μm. Compared with the current liquid crystal layer with a thickness ranging from 3 μm to 5 μm, the whole thickness of the liquid crystal layer 04 according to the embodiments of the present disclosure is reduced.

Based on a negative relationship between a deflection speed of the liquid crystal molecule and the thickness of the liquid crystal layer, that is, the greater the thickness of the liquid crystal layer 04, the slower the deflection speed of the liquid crystal molecule 042 in the liquid crystal layer 04, and the smaller the thickness of the liquid crystal layer 04, and the faster the deflection speed of the liquid crystal molecule 042 in the liquid crystal layer 04, the deflection speed of the liquid crystal molecule 042 may be improved by configuring the liquid crystal layer with a small thickness. That is, the liquid crystal molecule 042 may quickly respond to the voltage difference to complete the deflection. Therefore, a refresh rate of the display module is relatively improved while a response speed is improved.

According to a test, in the current liquid crystal layer with the thickness ranging from 3 μm to 5 μm, time for the liquid crystal molecule 042 to complete the deflection is about 16 milliseconds (ms), and the refresh rate of the display module only reaches 60 hertz (Hz). At this moment, when users watching the display module move their eyes or heads, dizziness is occurred due to a delay of a picture refresh. In the embodiments of the present disclosure, by defining the thickness of the liquid crystal layer 04 to be small, the response speed of the liquid crystal molecule 042 is improved efficiently, such that the refresh rate of the display module is further improved, and dizziness of the users is prevented, which improves user experience.

Optionally, the support layer 044 may be made of a transparent and vicious material, for example, an optical adhesive.

Optionally, the liquid crystal molecule 042 may be any one of following modes: a twisted nematic (TN) type, a vertical alignment (VA) type, an advanced super dimension (ADS) type, and an in-plane switching (IPS) type.

Figure 11:
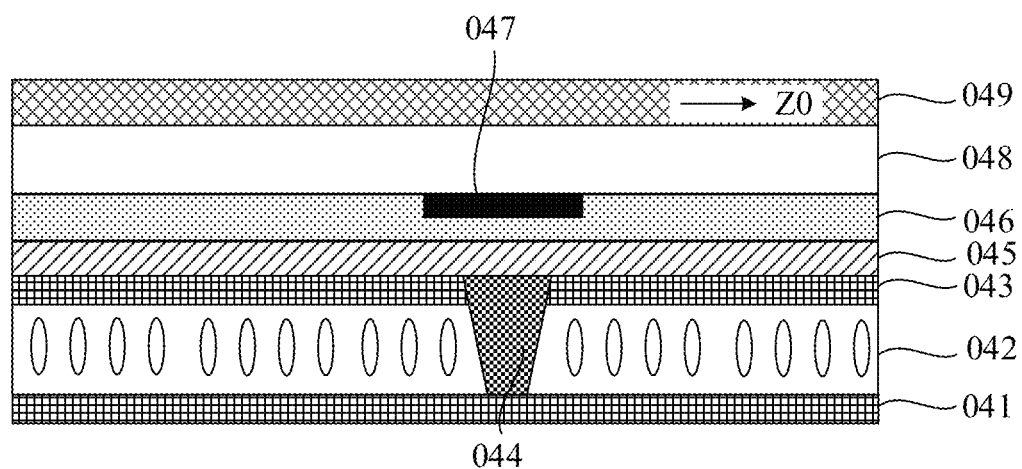
FIG. 11 is a schematic structural diagram of another liquid crystal layer according to an embodiment of the present disclosure.

Optionally, FIG. 11 is a schematic structural diagram of another liquid crystal layer according to an embodiment of the present disclosure. As shown in FIG. 11, the liquid crystal layer 04 may further include: a common electrode 045, a third planarization layer 046, a first black matrix (BM) layer 047, a packaging cover 048, and a composite optical film 049 that are disposed on a side, distal from the base substrate 01, of the second alignment layer 043, and are successively arranged along the direction away from the base substrate 01.

An orthographic projection of the first black matrix layer 047 on the base substrate 01 may cover an orthographic projection of the support layer 044 on the base substrate 01. In some embodiments, the orthographic projection of the first black matrix layer 047 on the base substrate 01 may also be only overlapped with the orthographic projection of the support layer 044 in the base substrate 01.

The first black matrix layer 047 may be configured to block light leakage at the support layer 044. The third planarization layer 046 may be configured to planarize the first black matrix layer 047. The composite optical film 049 may be configured to modulate a polarization state of the light, such that only the light satisfying the particular polarization state may be exited from the display side.

Optionally, the composite optical film 049 may include a linear polarizer, a quarter-wave plate, and a half-wave plate. The composite optical film 049 may also be referred to as a circular polarizer.

Optionally, an included angle $\theta_{pol}$ between a light absorption axis of the linear polarizer and a target axis, an included angle $\theta_{1/2}$ between a slow axis of the quarter-wave plate and the target axis, and an included angle $\theta_{1/4}$ between a slow axis of the half-wave plate and the target axis may satisfy:

$$\theta_{pol} - 2\theta_{1/2} + \theta_{1/4} = 45 \text{ degrees}(°).$$

Referring to FIG. 11, the target axis may be a preset coordinate axis z0, which is generally 0 degrees.

By defining the above included angles, it may be further ensured that the light is fully transmitted from the liquid crystal layer 04 to the side, distal from the base substrate 01, of the liquid crystal layer 04 after reflected by the pixel electrode 03, that is, transmittance (also known as a liquid crystal efficiency) of the liquid crystal layer 04 is improved.

Taking the TN type liquid crystal molecule as an example, according to a test, a good transmittance of the liquid crystal layer 04 is achieved by using the following included angles and rubbing directions: $\theta_{pol}$ is 80 degrees, $\theta_{1/2}$ is 62.5 degrees, and $\theta_{1/4}$ is 0 degrees. At the same time, phase retardation of the half-wave plate may be defined to range from 270 nm to 280 nm, and phase retardation of the quarter-wave plate may be defined to range from 150 nm to 170 nm. Correspondingly, the rubbing direction of the first alignment layer 041 may be defined to range 110 degrees to 120 degrees, and the rubbing direction of the second alignment layer 043 may be defined to range from 50 degrees to 60 degrees. In addition, a difference between a refractive index of a direction of a fast axis and a refractive index of a direction of a slow axis of the composite optical film is greater than or equal to 0.13 and less than or equal to 0.14. The thickness of the liquid crystal layer 04 is defined to range from 1 μm to 2 μm. Based on this, the phase retardation ranges from 200 nm to 210 nm, such that a good liquid crystal efficiency is achieved at a smaller box thickness (i.e., the liquid crystal layer with a small thickness).

Figure 12:
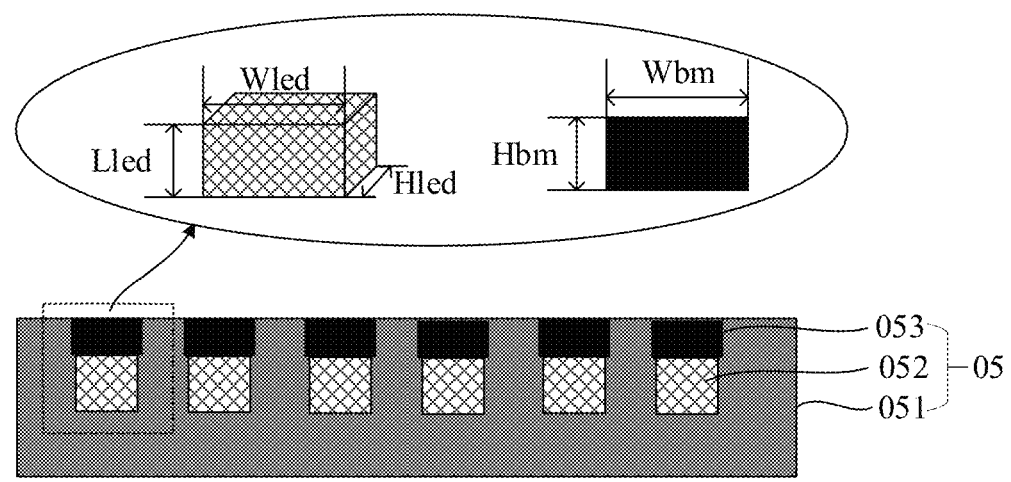
FIG. 12 is a schematic structural diagram of a light source according to an embodiment of the present disclosure.

Optionally, the light source 05 according to the embodiments of the present disclosure may be a direct-type light source. FIG. 12 is a schematic structural diagram of a light source. Referring to FIG. 12, the light source 05 may include: a filling layer 051, a plurality of light-emitting units 052, and a plurality of second black matrix layers 053 that are successively arranged along the direction away from the base substrate 01.

An orthographic projection of one of the second black matrix layers 053 on the base substrate 01 may be overlapped with an orthographic projection of one of the light-emitting units 052 on the base substrate 01. The overlap may mean that the orthographic projection of the second black matrix layer 053 on the base substrate 01 is coincident with or overlapped with the orthographic projection of the light-emitting unit 052 on the base substrate 01.

The second black matrix layer 053 may be configured to block light leakage of the light-emitting unit 052, such that the light emitted by the light-emitting unit 052 is prevented from being directly irradiated to eyes of the users. The filling layer 051 may be configured to prevent lateral light leakage of the light-emitting unit 052 and reduce light reflective between adjacent interfaces.

Optionally, the filling layer 051 may be water gel, and a refractive index of the filling layer 051 may be greater than or equal to 1.4 and less than or equal to 1.8.

Each of the light-emitting units 052 according to the embodiments of the present disclosure may include a plurality of light-emitting diodes.

An orthographic projection of one of the light-emitting diodes on the base substrate 01 may be overlapped with an orthographic projection of the plurality of pixels on the base substrate 01. For example, the orthographic projection of one of the light-emitting diodes on the base substrate 01 may be overlapped with the orthographic projections of 5*5 pixels (i.e., the pixels of 5 rows and 5 columns) on the base substrate 01. That is, a ratio of an arrangement period of the light-emitting diode to an arrangement period of the pixel may be 1:5. According to a test, the arrangement may ensure a good uniformity of display brightness, which may generally reach 92%.

Optionally, referring to FIG. 12, each of the light-emitting diodes may be a cuboid, and a length and/or a width of each of the light-emitting diodes may be greater than or equal to 5 μm to 30 μm.

Optionally, referring to FIG. 12, each of the second black matrix layers 053 may be rectangular, and a width Wbm of each of the second black matrix layers 053 may satisfy:

$(Wbm/2-Wled/2)/(Hled+Hbm)=\tan(\arcsin(1/nx))$.

In other words, the width of each of the second black matrix layers 053 at least satisfies:

$Wbm<2*\tan(\arcsin(1/nx))*(Hled+Hbm)+Wled$.

The Wled may refer to the width of each of the light-emitting diodes, the Lled may refer to a height of each of the light-emitting diodes, the Hled may refer to a thickness of each of the light-emitting diodes, the Hbm may refer to a thickness of each of the second black matrix layers 053, and the nx may refer to the refractive index of the filling layer 051. Assuming that the length and/or the width of each of the light-emitting diodes is 5 μm, the Hled is 1 μm, and the Hbm is 1 μm, then the Wbm is at least 6.8 μm.

Optionally, referring to FIG. 12, the width Wled of the light-emitting diode may refer to a length of the light-emitting diode in a row direction, and the height Lled of the light-emitting diode may refer to a length of the light-emitting diode in a column direction, and the thickness Hled of the light-emitting diode may refer to a length of the light-emitting diode in another direction perpendicular to the row direction and the column direction. The width Wbm of the second black matrix layer 053 may refer to a length of the second black matrix layer 053 in a row direction, and the thickness Hbm of the second black matrix layer 053 may refer to a length of the second black matrix layer 053 in a column direction.

Optionally, each of the light-emitting units 052 according to the embodiments of the present disclosure may include: a red light-emitting diode (LED) R, a blue light-emitting diode B, and a green light-emitting diode G.

Figure 13:
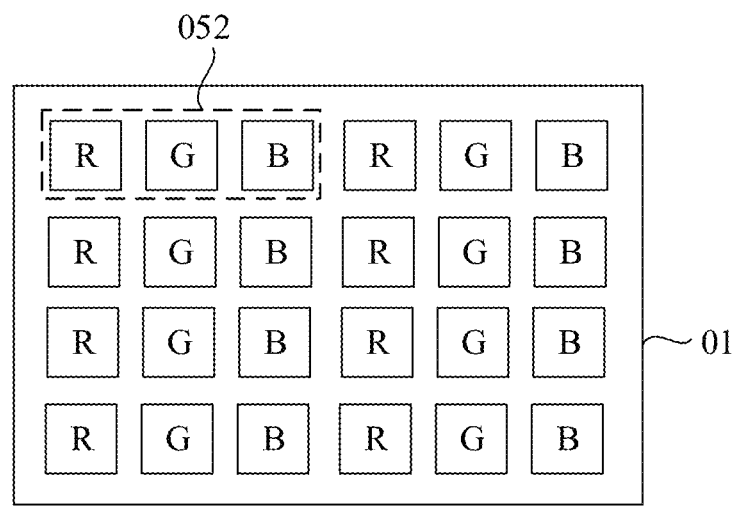
FIG. 13 is a schematic arrangement diagram of a light-emitting diode according to an embodiment of the present disclosure.

In an optional embodiment, referring to FIG. 13, the red light-emitting diode R, the blue light-emitting diode B, and the green light-emitting diode G in each of the light-emitting units 052 may arrange in a row direction. Moreover, the red light-emitting diode R, the blue light-emitting diode B, and the green light-emitting diode G in each of the light-emitting units 052 are arranged in the same order. That is, each of the light-emitting diodes in each row of the light-emitting units 052 may be successively arranged in an order of one red light-emitting diodes R, one blue light-emitting diodes B, and one green light-emitting diodes G. The arrangement may also be referred to as equal-spacing arrangement.

Figure 14:
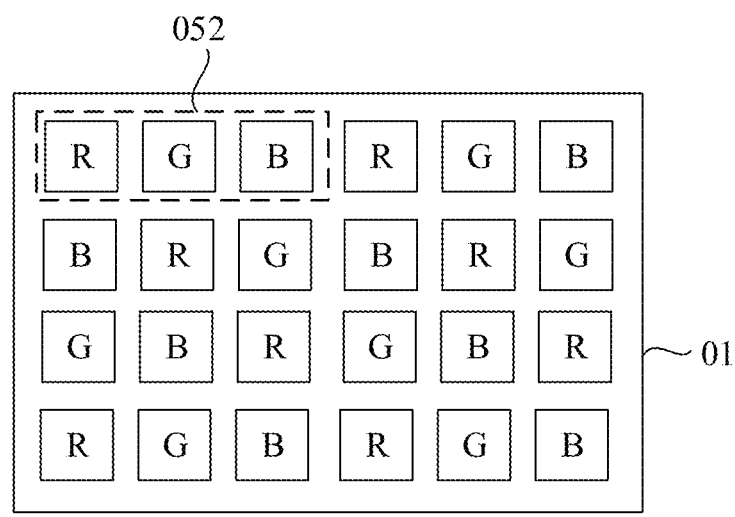
FIG. 14 is a schematic arrangement diagram of another light-emitting diode according to an embodiment of the present disclosure.

In an optional embodiment, referring to FIG. 14, the red light-emitting diode R, the blue light-emitting diode B, and the green light-emitting diode G in each of the light-emitting units 052 may be arranged in a column direction. In each three adjacent rows of the light-emitting units 052, the red light-emitting diodes R, the blue light-emitting diodes B, and the green light-emitting diodes G in the rows of the light-emitting units 052 are arranged in different orders. For example, in the display module as shown in FIG. 14, in each three adjacent rows of the light-emitting units, the light-emitting diodes in a first row are successively arranged in an order of one red light-emitting diode R, one blue light-emitting diode B, and one green light-emitting diode G; the light-emitting diodes in a second row are successively arranged in an order of one blue light-emitting diode B, one red light-emitting diode R, and one green light-emitting diode G; and the light-emitting diodes in a third row are successively arranged in an order of one green light-emitting diode G, one blue light-emitting diode B, and one red light-emitting diode R. The arrangement may also be referred to as equal-spaced staggered arrangement.

Figure 15:
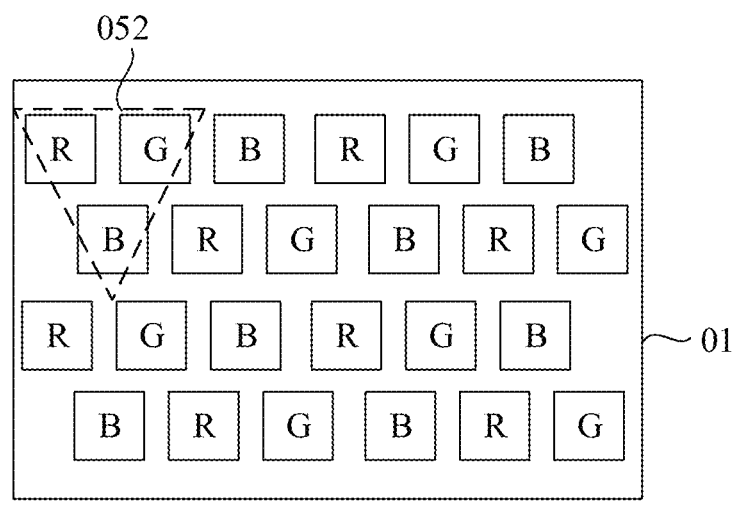
FIG. 15 is a schematic arrangement diagram of yet another light-emitting diode according to an embodiment of the present disclosure.

In an optional embodiment, referring to FIG. 15, the red light-emitting diode R, the blue light-emitting diode B, and the green light-emitting diode G in each of the light-emitting units 052 may be arranged in a triangle. That is, in each two adjacent rows of the light-emitting units 052, the light-emitting diodes in a first row are successively arranged in an order of one red light-emitting diode R, one green light-emitting diode G, and one blue light-emitting diode B; the light-emitting diodes in a second row are successively arranged in an order of one blue light-emitting diode B, one red light-emitting diode R, and one green light-emitting diode G; and one red light-emitting diode R, one green light-emitting diode G, and one blue light-emitting diode B in each two adjacent rows may be arranged in the triangle shown in FIG. 15. The arrangement may also be referred to as triangular arrangement.

As shown in FIG. 13 to FIG. 15, each of the light-emitting units 052 includes only one red light-emitting diode R, one green light-emitting diode G, and one blue light-emitting diode B. In some embodiments, each of the light-emitting units 052 may also include one red light-emitting diode R, one blue light-emitting diode B, and two green light-emitting diodes G.

Figure 16:
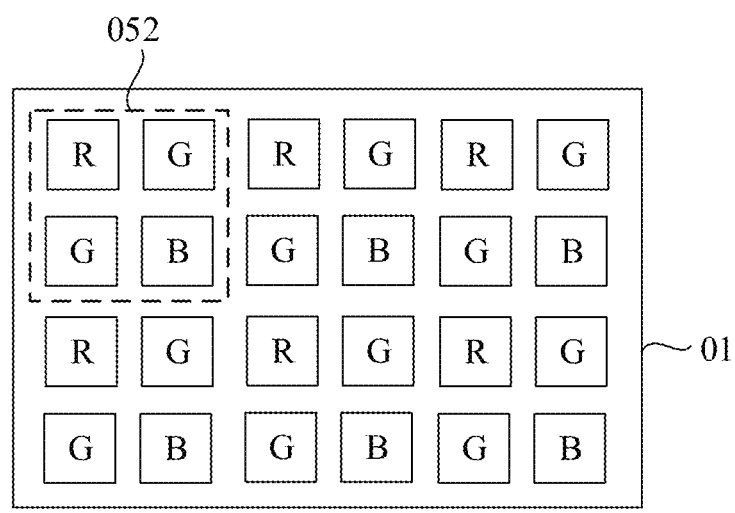
FIG. 16 is a schematic arrangement diagram of still another light-emitting diode according to an embodiment of the present disclosure.

In an optional embodiment, on the premise that each of the light-emitting units 052 includes two green light-emitting diodes G, referring to FIG. 16, the red light-emitting diode R, the blue light-emitting diode B, and the two green light-emitting diodes G in each of the light-emitting units 052 may be arranged in a rectangle. That is, in each two adjacent rows of the light-emitting units 052, the light-emitting diodes in a first row may be successively arranged in an order of one red light-emitting diode R and one green light-emitting diode G; and the light-emitting diodes in a second row may be successively arranged in an order of one green light-emitting diode G and one blue light-emitting diode B. The arrangement may also be referred to as an RGBG arrangement.

Optionally, in the embodiments of the present disclosure, the orthographic projection of one of the light-emitting diodes on the base substrate 01 may be overlapped with the orthographic projections of the plurality of pixels on the base substrate 01.

For example, the orthographic projection of one of the light-emitting diodes on the base substrate 01 may be overlapped with the orthographic projections of 5*5 pixels (i.e., the pixels of 5 rows and 5 columns) on the base substrate 01. That is, the ratio of the arrangement period of the light-emitting diode to the arrangement period of the pixel may be 1:5. According to the test, the arrangement ensures the good uniformity of the display brightness, which may generally reach 92%.

Optionally, in the embodiments of the present disclosure, in the red light-emitting diode R, the blue light-emitting diode B, and the green light-emitting diode G, and the length and/or the width of each of the light-emitting diodes may be greater than or equal to 5 μm to 30 μm.

Figure 17:
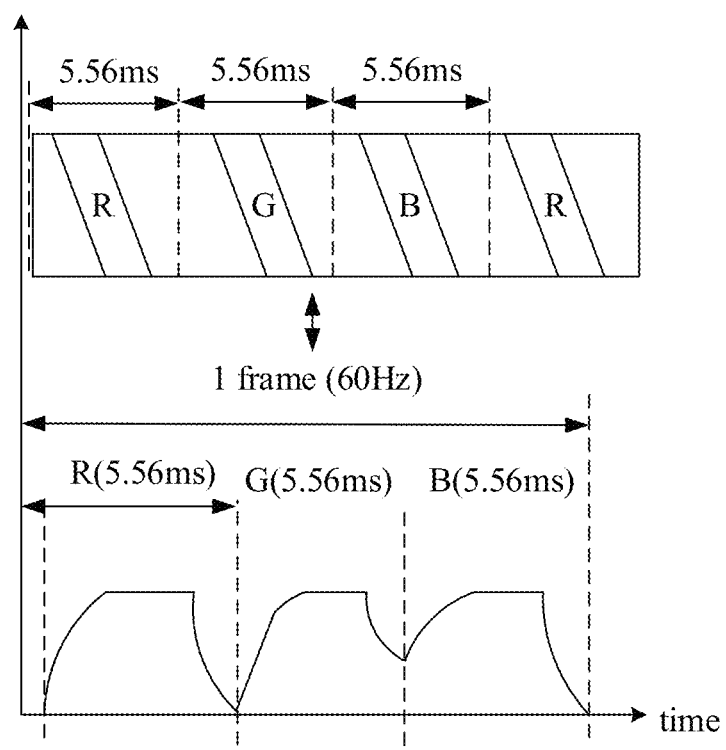
FIG. 17 is a timing diagram of refreshing a display module according to an embodiment of the present disclosure.

Exemplarily, in a scenario where the display module is a full high definition (FHD) display module, in the case that the resolution of the display module is 1980*1020, wherein 1980*1020 means that the display module includes 1980 rows and 1020 columns of the pixel circuits, each of the light-emitting units 052 includes one red light-emitting diode R, one green light-emitting diode G, and one blue light-emitting diode B. The thickness of the liquid crystal layer 04 ranges from 1 μm to 2 μm, a 60 Hz picture is displayed, and the RGB diodes are lighted filed successively; and the drive transistor T1 is made of LTPS, then the refresh rate of the display module according to the embodiments of the present disclosure is as follows:

For display of the 60 Hz picture, the refresh rates of lighting a R picture displayed by the red light-emitting diode R, lighting a G picture displayed by the green light-emitting diode G, and lighting a B picture displayed by the blue light-emitting diode B shall be 180 Hz, and corresponding refresh time is about 5.56 ms. FIG. 17 is an equivalent timing diagram. Correspondingly, it takes about 1920*1 μs=1.92 ms to refresh the overall picture, and a response duration of the liquid crystal molecule 042 under the low box thickness is 2 ms. In this way, it may be determined that an ON duration of the light-emitting diode may be: 5.5 ms−(1.92 ms+2 ms)=1.58 ms. The ON duration is long, and correspondingly a good display effect is achieved.

Optionally, the display module according to the embodiments of the present disclosure may further include a plurality of lenses 09 disposed on a side, distal from the base substrate 01, of the light source 05 and arranged in an array. The lens 09 may be configured to transmit the light and control the light, and a range of light transmitted through the lens 09 may be long, such that the brightness may also be improved.

Optionally, an orthographic projection of one of the lenses 09 on the base substrate 01 may be overlapped with the orthographic projections of the plurality of pixels on the base substrate 01. For example, the orthographic projection of one of the lenses 09 on the base substrate 01 may be overlapped with the orthographic projections of 100*100 pixels (i.e., 100 rows and 100 columns of pixels) on the base substrate 01. That is, the ratio of the arrangement period of the light-emitting diode to the arrangement period of the pixel may be 1:100.

Figure 18:
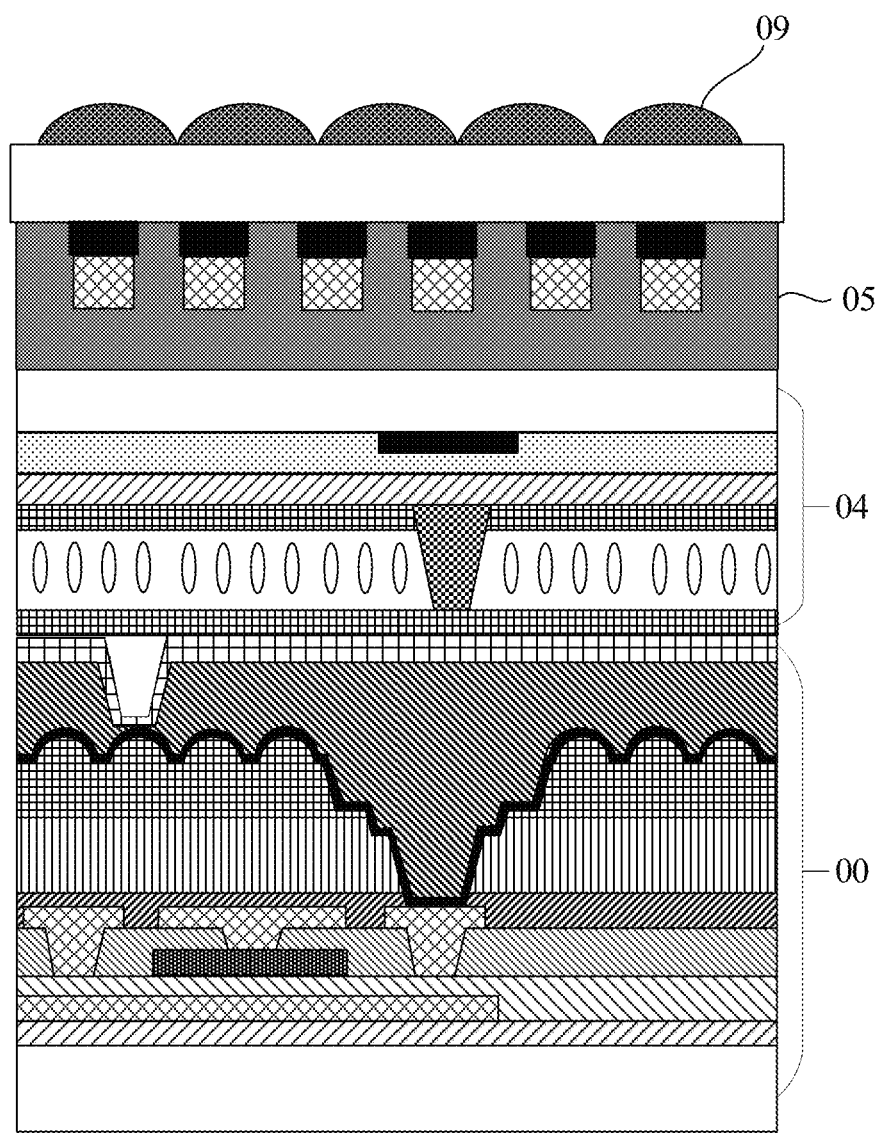
FIG. 18 is a schematic overall structural diagram of a display module according to an embodiment of the present disclosure.
Figure 19:
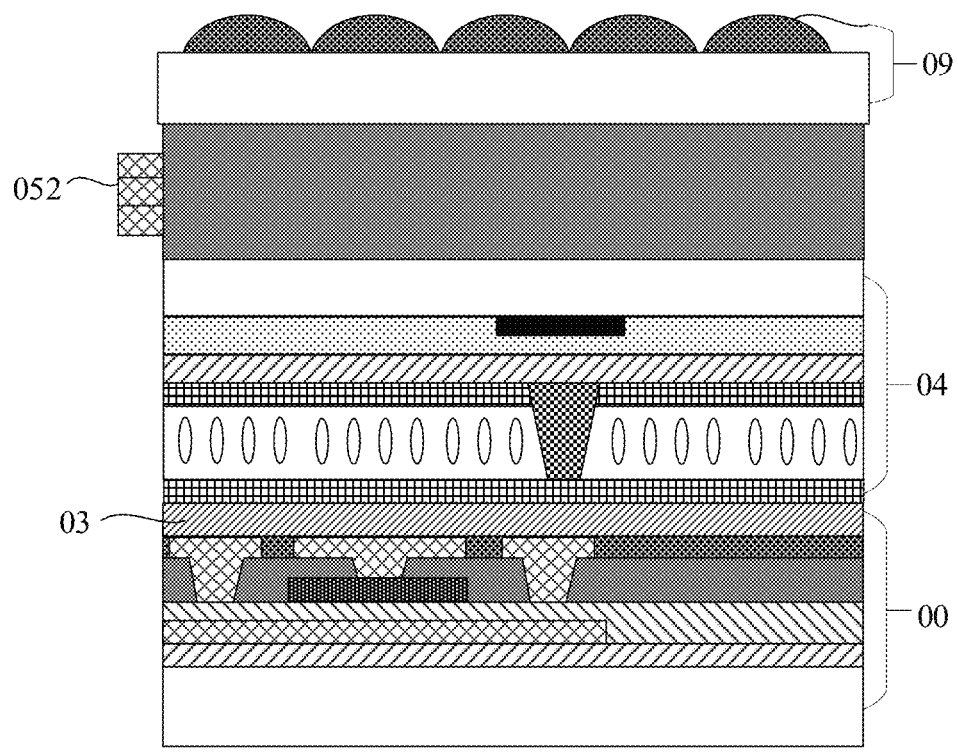
FIG. 19 is a schematic overall structural diagram of another display module according to an embodiment of the present disclosure.

Taking a scenario where the light source is a direct-type light source and includes the lens 09 as an example, FIG. 19 is an overall schematic structural diagram of a display module according to an embodiment of the present disclosure. Referring to FIG. 18, in the structure, the pixel electrode 03 may be a shape shown in FIG. 3. The structure shown in FIG. 18 employs a combination of a front light source and the protrusion layer with the protrusions, such that the light is uniformly mixed and the display effect is effectively improved.

In some embodiments, the light source also may be a side-lit type light source. Taking a scenario where the light source is the side-lit type light source and includes the lens 09 as an example, FIG. 19 is an overall schematic structural diagram of another display module according to an embodiment of the present disclosure. Referring to FIG. 19, because the side-lit type light source is configured, and the light emitted by the side-lit type light source is reflected in all directions and achieves a scattering effect, the pixel electrode 03 may be a planar structure shown in FIG. 2, that is, the pixel electrode 03 and the reflective electrode 031 may be reconfigured. The display module may not include the protrusion layer 07 with the plurality of protrusions. Correspondingly, the display module may not include the first planarization layer 06, the second planarization layer 08, or the dielectric layer. The pixel electrode 03 may be directly connected to the pixel circuit 02, and electrically connected to the pixel circuit 02. In addition, it is not necessary to configure the black matrix layer to block the light emitted by the light source. In this way, light transmittance is improved, and films required for the display module are effectively reduced, such that the manufacturing process is simplified and the cost is reduced.

It should be noted that, on the premise that the light source is the side-lit type light source, the light may be obtained by configuring a dot. That is, a plurality of light extraction structures uniformly arranged may be arranged on a side, proximal to the light source, of the filling layer 051, and the light emitted by the light source may be irradiated to the pixel electrode 03 via the plurality of light extraction structures uniformly arranged.

Due to uniform arrangement of the plurality of light extraction structures, on the premise that the side-lit type light source is configured, the light is uniformly irradiated to the pixel electrode 03. That is, the light may be uniformly distributed in the whole display module.

Figure 20:
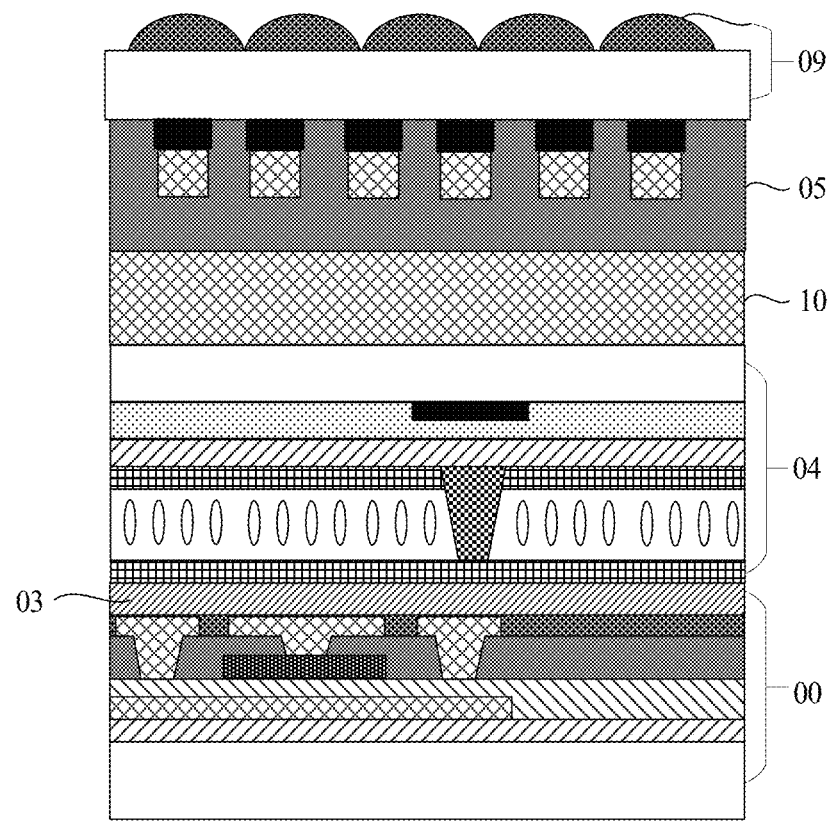
FIG. 20 is a schematic overall structural diagram of yet another display module according to an embodiment of the present disclosure.

FIG. 20 is a schematic overall structural diagram of yet another display module according to an embodiment of the present disclosure. Referring to FIG. 20, the display module may further include a light diffusion layer 10 disposed between the liquid crystal layer 04 and the light source 05.

The light diffusion layer 10 may be configured to diffuse and reflect the light. In this way, referring to FIG. 20, because it is not necessary to produce the protrusion layer 07 to diffuse and the reflect the light, on the premise that the light diffusion layer 10 is included, the direct-type light source may be configured directly, and the pixel electrode 03 may be the planar structure shown in FIG. 2, that is, the pixel electrode 03 and the reflective electrode 031 may be reconfigured and directly connected to the pixel circuit 02. In this way, the films required for the display module may also be reduced, and the manufacturing process is simplified and the cost is reduced.

It should be noted that in FIG. 18 to FIG. 20, the composite optical film is not shown, and the structures of layers, proximal to a side of the base substrate 01, of the liquid crystal layer 04 are all uniformly marked as 00.

Figure 21:
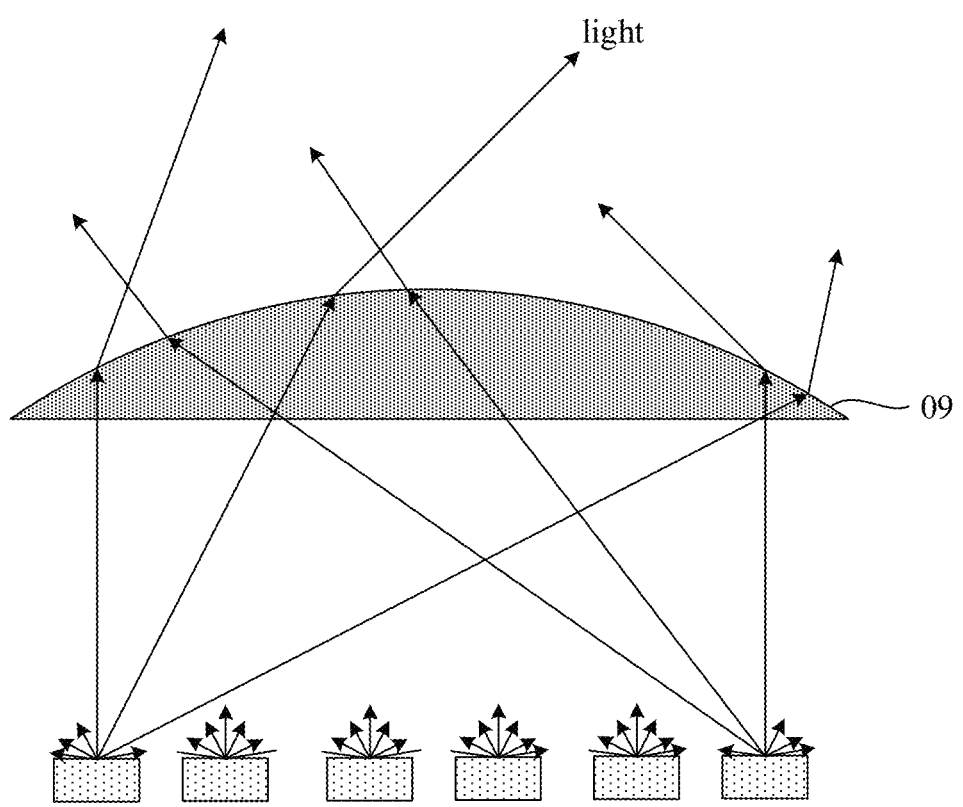
FIG. 21 is a schematic equivalent diagram of light emitted through a lens according to an embodiment of the present disclosure.

Optionally, a focal length of the lens 09 according to the embodiments of the present disclosure may be greater than or equal to 2 micrometer (mm) and less than or equal to 10 mm. A pore size of the lens 09 may be greater than or equal to 0.5 mm and less than or equal to 1 mm Optionally, in the embodiments of the present disclosure, the reflective electrode 031 in the pixel electrode 03 may be disposed in a focal plane (i.e., a plane where a focus disposed in) of the plurality of lenses arranged in an array. In this way, the light exited from each included angle may be collimated to a specific included angle, and the good display effect is achieved. FIG. 21 is an equivalent schematic diagram of light irradiated.

Figures 22, 23:
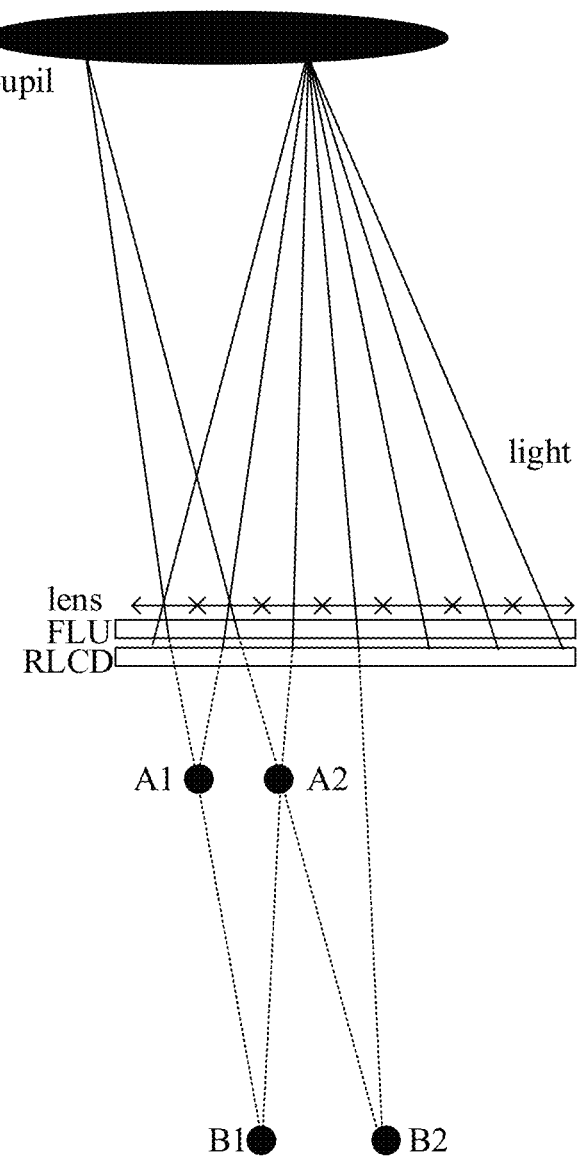
FIG. 22 is a schematic equivalent diagram of an image point constructed by a lens based on light.
FIG. 23 is a flowchart of a method for driving a display module according to an embodiment of the present disclosure.

Optionally, in the embodiments of the present disclosure, in the case that the light by the lens 09 is collimated, light distribution shown in FIG. 22 may be achieved in space. Referring to FIG. 20, the light may be transmitted through the lens 09 to the eyes of the users, and reconstruct image points A1 and A2 in space, and the picture is presented. Different lenses 09 may construct the image points at different depths to achieve a light filed display including information of depth of filed. For example, a first lens 09 and a second lens 09 may jointly construct the image point A1, and the second lens 09 and a third lens 09 may jointly construct the image point A2. The first lens 09 and the third lens 09 may jointly construct an image point B1, and the second lens 09 and a fourth lens 09 may jointly construct an image point B2, and so on.

RLCD shown in FIG. 22 refers to the base substrate 01 and structures of each layer disposed between the front light source FLU and the base substrate 01.

Referring to the above embodiments all together, in the display module according to the embodiments of the present disclosure, because the pixel electrode 03 covers the pixel circuit 02, the aperture ratio is improved. The response duration of the liquid crystal molecule is improved and the refresh rate is improved because the support layer 044 with a low thickness is configured to reduce the thickness of the liquid crystal layer 04. On the premise that the front light source is configured, the protrusion layer 07 with the protrusions is provided to configure the pixel electrode 03, and thus the uniform mixed light is ensured. In addition, because the lens is provided, the light is controlled, and the aperture ratio is further improved, such that a full-color near-eye light-field display effect is achieved by black-and-white pixels.

In summary, the embodiments of the present disclosure provide a display module. The display module includes the pixel electrode at least including the reflective electrode, and the pixel electrode may reflect the light transmitted by the liquid crystal layer to the liquid crystal layer driven by the pixel circuit, such that the light is exited via the liquid crystal layer and the normal display of the display module is ensured. The pixel electrode covers the pixel circuit. That is, the region where the pixel electrode is disposed may be overlapped with the region where the pixel circuit is disposed. Compared with the transmissive type display module, because it is not necessary to separately reserve the region to specially configure the pixel circuit, the resolution of the display module may be effectively improved.

FIG. 23 is a flowchart of a method for driving a display module according to an embodiment of the present disclosure. The method is applicable to the display module as described above. An implement premise of the method is that: the display module is designed to include a plurality of display partitions successively arranged along a column direction, and each of the display partitions may include a plurality of rows of the pixel circuits. For example, referring to FIG. 24, a display module 000 shown in FIG. 24 includes four display partitions A11 to A14 in total.

Still referring to FIG. 23, the method ta least includes the following steps.

In step 2301, for at least one target display partition in the plurality of display partitions, the drive signal is supplied to the plurality of rows of the pixel circuit in the target display partition row-by-row.

The drive signal may be configured for the pixel circuit to load the drive voltage to the pixel electrode. That is, in the embodiments of the present disclosure, the display module may be driven in partitions to operate. In this way, flexibility of the display is improved.

Optionally, the display module may further include a gate drive circuit and a source drive circuit. Referring to the embodiment shown in FIG. 7, the gate drive circuit may be electrically connected to the gate line, and the source drive circuit may be electrically connected to the data line. The gate drive circuit may be configured to supply a gate drive signal to the gate line, and the source drive circuit may supply a data signal to the data line. Base on this, in the embodiments of the present disclosure, a plurality of gate drive circuits may be set, and the plurality of gate drive circuits may be in one-to-one correspondence to the plurality of display partitions. Each of the gate drive circuits may separately supply the gate drive signal row by row to the gate line in the corresponding display partition, such that the drive transistor T1 in each row of the pixel circuits electrically connected to the gate line may be opened row by row, and the drive signal is supplied to the pixel electrode.

Figure 24:
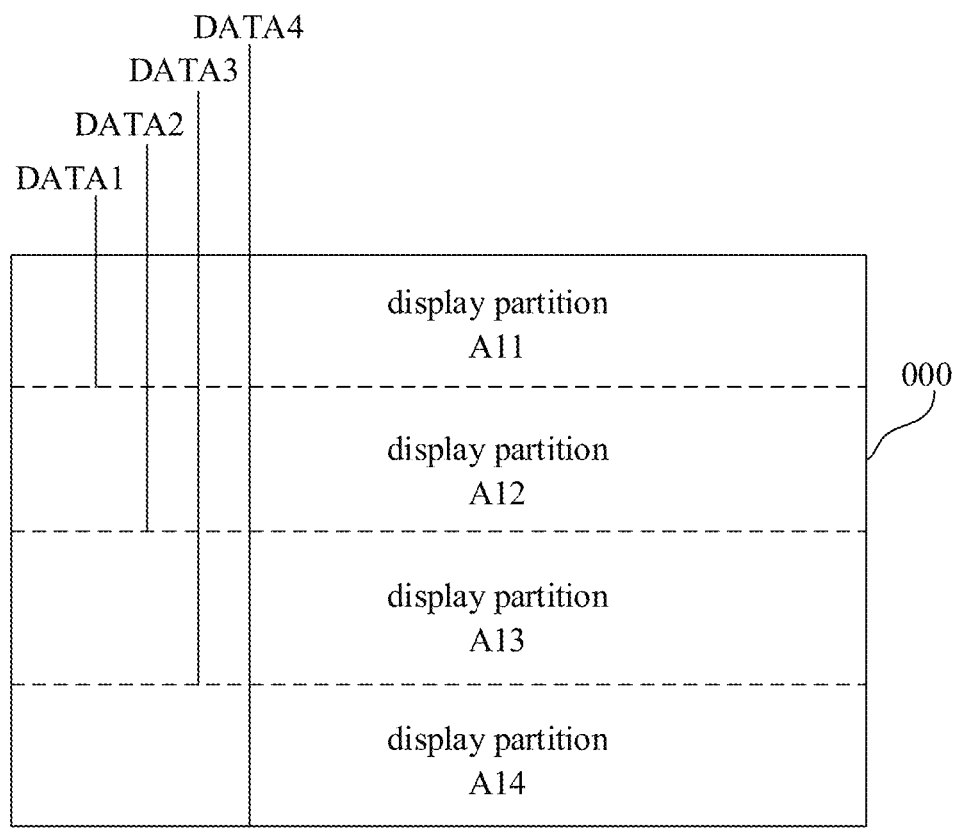
FIG. 24 is a schematic structural diagram of a display module according to embodiment of the present disclosure.

Optionally, referring to FIG. 24, in the embodiments of the present disclosure, the numbers of rows of the pixel circuits in the display partitions may be equal, and stages of supplying the drive signal to the pixel circuit in the target display partitions may be overlapped. For example, each of the gate drive circuits may simultaneously supply the gate drive signal to the i row in the corresponding display partition, and i is greater than or equal to 1 and less than or equal to the rows of the pixel circuits in the display partition.

Optionally, in each of the display partitions, the pixel circuit in the same column may be electrically connected to the data line in the same group, and the data lines electrically connected to different display partitions may be different. Each group of the data lines may include one or more data lines. For example, referring to FIG. 24, in the four display partitions shown in FIG. 24, in a first partition A11, the data line electrically connected to the same column pixel circuit is DATA 1. In a second partition A12, the data line electrically connected to the same column pixel circuit is DATA 2. In a third partition A13, the data line electrically connected to the same column pixel circuit is DATA 3. In a fourth partition A14, the data line electrically connected to the same column pixel circuit is DATA 4. The source drive circuit may supply the data signals of different potentials to different data lines, such that the display brightness of different display partitions is different and the flexibility of the display is further improved.

In conjunction with the display module shown in FIG. 24 and the above refresh rate records for an FHD display module, the original FHD needs to scan 1920 lines of the pixel circuits, and in the display partitions divided into four, only 1920/4=480 lines of the pixel circuits needed to be scanned in each of the four partitions. When the four display partitions are refreshed at the same time, the refresh time may be reduced from 1.92 ms to 0.48 ms. If the ON duration of the light-emitting diode is maintained in 1.58 ms, the response duration of the liquid crystal molecule 042 is maintained in 2 ms, and then a scan duration of a frame may be 0.48+1.58+2=4.06 ms. A total duration of scanning three images with different colors is 4.06*3=12.18 ms. In this way, the refresh rate may reach 82 Hz. The refresh rate is further improved and the display effect is enhanced.

In summary, the embodiments of the present disclosure provide a method for driving a display module; and in the method, the display module may be divided into the plurality of display partitions, and for at last one target display partition of the plurality of display partitions, the drive signal is supplied to the plurality of rows of the pixel circuits in the target display partition row by row. That is, the display of each of the display partitions may be separately controlled, such that the flexibility of the display is improved.

Figure 25:
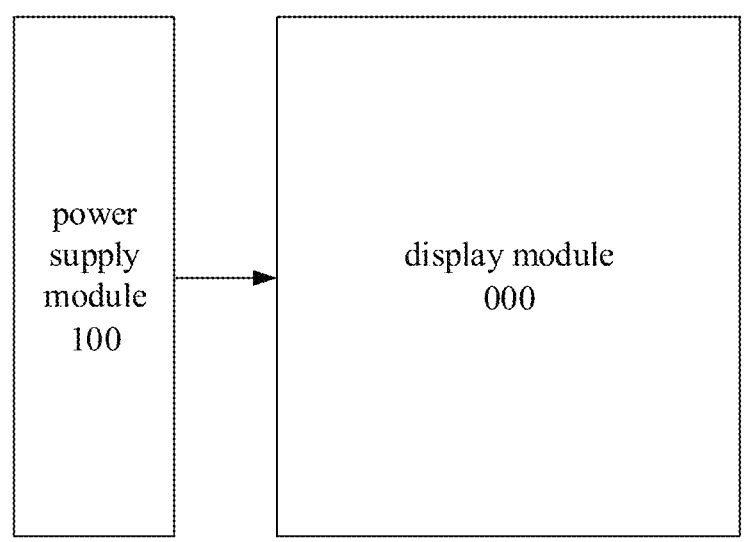
FIG. 25 is a schematic structural diagram of a display device according to an embodiment of the present disclosure.

FIG. 25 is a schematic structural diagram of a display device according to an embodiment of the present disclosure. As shown in FIG. 25, the display device may include a power supply module 100, and the display module 000 as described above.

The power supply module 100 may be electrically connected to the display module 000, and the power supply module 100 may be configured to supply power to the display module 000.

Optionally, the display device may be the near-eye light-field display device. For example, the display device may be a virtual reality (VR) display device, and the VR display device may be a head-mounted display device, for example, a VR glass. Optionally, the display device may be an augmented reality (AR) display device. In some embodiments, the display device may also be a mobile phone, a tablet, a television, a monitor, a laptop, a navigator, or any other product or component with a display function.

Described above are merely exemplary embodiments of the present disclosure, and are not intended to limit the present disclosure. Therefore, any modifications, equivalent substitutions, improvements, and the like made shall fall within the protection scope of the present disclosure, without departing from the spirit and principle of the present disclosure.

What is claimed is:

1. A display module, comprising:
   a base substrate; and
   a plurality of pixel circuits arranged in an array, a plurality of pixel electrodes arranged in an array, a liquid crystal layer, and a light source that are disposed on a side of the base substrate and successively arranged along a direction away from the base substrate; wherein the pixel circuit at least comprises a drive transistor, the drive transistor comprising a gate electrode, a first electrode, and a second electrode; and the pixel electrode at least comprises a reflective electrode;
   wherein the plurality of pixel electrodes are electrically connected to the plurality of pixel circuits in one-to-one correspondence, and an orthographic projection of at least one of the pixel circuits on the base substrate is within an orthographic projection of a pixel electrode corresponding to the pixel electrode on the base substrate; and the pixel electrode is configured to reflect light transmitted by the liquid crystal layer to the liquid crystal layer, such that the light is exited from a side, distal from the base substrate, of the liquid crystal layer; and
   the display module further comprises a first planarization layer and a protrusion layer, disposed between the reflective electrode and the pixel electrode, and successively arranged along the direction away from the base substrate, wherein a side, distal from the base substrate, of the protrusion layer is provided with a plurality of protrusions.

2. The display module according to claim 1, wherein the gate electrode of the drive transistor is electrically connected to a gate line, the first electrode of the drive transistor is electrically connected to a data line, and the second electrode of the drive transistor is electrically connected to the pixel electrode; wherein the data line and the gate line are covered by the pixel electrode.

3. The display module according to claim 2, wherein the drive transistor in each of the plurality of pixel circuits disposed in the same column is electrically connected to two data lines; and the two data lines are covered by the pixel electrode.

4. The display module according to claim 1, wherein the pixel electrode further comprises a transparent electrode disposed on a side, distal from the base substrate, of the reflective electrode; and the display module further comprises:
   a second planarization layer, disposed between the reflective electrode and the transparent electrode;
   wherein the reflective electrode is electrically connected to the pixel circuit by extending through the protrusion layer and a first via hole in the first planarization layer, and the reflective electrode is electrically connected to the transparent electrode by extending through a second via hole of the second planarization layer.

5. The display module according to claim 4, wherein the first via hole and the second via hole are spaced apart, and an orthographic projection of the first via hole on the base substrate is not overlapped with an orthographic projection of the second via hole on the base substrate.

6. The display module according to claim 4, wherein a protrusive direction of the protrusion is the direction away from the base substrate, and a section of the protrusion perpendicular to the base substrate is arc-shaped, and orthographic projections of the plurality of protrusions on the base substrate are overlapped with the orthographic projection of one of the pixel circuits on the base substrate.

7. The display module according to claim 6, wherein a slope angle of the protrusion is greater than or equal to 30 degrees and less than or equal to 60 degrees; and
a ratio of a spacing between each two adjacent protrusions of the protrusions to a diameter of the orthographic projection of each of the protrusions in each two adjacent protrusions of the protrusions on the base substrate is less than or equal to 1.

8. The display module according to claim 4, wherein the plurality of protrusions are arranged in an array; or
the plurality of protrusions comprise a plurality of protrusion groups arranged in a first direction, each of the protrusion groups comprising at least two of the protrusions arranged in a second direction, wherein an included angle between the second direction and the first direction is an acute included angle.

9. The display module according to claim 4, wherein a material of the protrusion layer comprises a resin; a material of the reflective electrode comprises a silver metal; a material of the transparent electrode comprises an indium tin oxide;
a surface morphology of the side, distal from the base substrate, of the reflective electrode is consistent with a surface morphology of the side, distal from the base substrate, of the protrusion layer; and
the reflective electrode comprises a plurality of reflective electrode blocks that are insulatively arranged, wherein one of the pixel circuits is correspondingly covered by each of the reflective electrode blocks.

10. The display module according to claim 1, wherein the liquid crystal layer comprises:
a first alignment layer, a liquid crystal molecule, and a second alignment layer that are successively arranged along the direction away from the base substrate; and
a support layer disposed between the first alignment layer and the second alignment layer, wherein a thickness of the support layer is greater than or equal to 1 μm and less than or equal to 2 μm.

11. The display module according to claim 10, wherein the liquid crystal layer further comprises: a common electrode, a third planarization layer, a first black matrix layer, a packaging cover plate, and a composite optical film that are disposed on a side, distal from the base substrate, of the second alignment, and are successively arranged along the direction away from the base substrate;
wherein an orthographic of the support layer on the base substrate is covered by an orthographic projection of the first black matrix layer on the substrate.

12. The display module according to claim 11, wherein the composite optical film comprises: a linear polarizer, a quarter-wave plate, and a half-wave plate;
wherein an included angle $\theta_{pol}$ between a light absorption axis of the linear polarizer and a target axis, an included angle $\theta_{1/2}$ between a slow axis of the quarter-wave plate and the target axis, and an included angle $\theta_{1/4}$ between a slow axis of the half-wave plate and the target axis satisfy: $\theta_{pol}-2\theta_{1/2}+\theta_{1/4}=45$ degrees.

13. The display module according to claim 1, wherein the light source is a direct-type light source, the direct-type light source comprising: a filling layer, a plurality of light-emitting units, and a plurality of second black matrix layers that are successively arranged along the direction away from the base substrate;
wherein an orthographic projection of one of the second black matrix layers on the base substrate is overlapped with an orthographic projection of one of the light-emitting units on the base substrate.

14. The display module according to claim 13, wherein a pixel is formed by each of the pixel electrodes and the common electrode in the liquid crystal layer; and
each of the light-emitting units comprises a plurality of light-emitting diodes, an orthographic projection of one of the light-emitting diodes on the base substrate being overlapped with orthographic projections of a plurality of pixels on the base substrate.

15. The display module according to claim 13, wherein each of the light-emitting units comprises a red light-emitting diode, a blue light-emitting diode, and a green light-emitting diode; wherein
the red light-emitting diode, the blue light-emitting diode, and the green light-emitting diode in each of the light-emitting units are arranged in a row direction; or
the red light-emitting diode, the blue light-emitting diode, and the green light-emitting diode in each of the light-emitting units are arranged in a triangle; or
each of the light-emitting units comprises two green light-emitting diodes, wherein the red light-emitting diode, the blue light-emitting diode, and the two green light-emitting diodes in each of the light-emitting units are arranged in a rectangle.

16. The display module according to claim 1, wherein the display module further comprises: a plurality of lenses disposed on a side, distal from the base substrate, of the light source, and arranged in an array;
wherein an orthographic projection of one of the lenses on the base substrate is overlapped with orthographic projections of a plurality of pixels in the display module on the base substrate, and the lens is configured to transmit the light.

17. The display module according to claim 16, wherein the reflective electrode is disposed in a focal plane of the plurality of lenses arranged in an array; or
a focal length of the lens is greater than or equal to 2 μm and less than or equal to 10 μm; and a pore size of the lens is greater than or equal to 0.5 μm and less than or equal to 1 μm.

18. The display module according to claim 1, wherein the display module further comprises: a light diffusion layer disposed between the liquid crystal layer and the light source.

19. A method for driving a display module, wherein the display module is the display module as defined in claim 1, and comprises a plurality of display partitions successively arranged along a column direction, each of the display partitions comprising a plurality of rows of pixel circuits;
the method comprising:
supplying a drive signal to the plurality of rows of the pixel circuits in the target display partition row by row for at least one of target display partitions in the plurality of display partitions, wherein the drive signal is configured for the pixel circuit to load a drive voltage to the pixel electrode, the numbers of rows of the pixel circuits in the display partitions are equal, and stages of supplying the drive signal to the pixel circuits in the target display partitions are overlapped.

20. A display device, wherein the display device is a near-eye light-field display device, the near-eye light-field display device comprising a display module, wherein the display device comprises:
a base substrate; and
a plurality of pixel circuits arranged in an array, a plurality of pixel electrodes arranged in an array, a liquid crystal layer, and a light source that are disposed on a side of the base substrate and successively arranged along a direction away from the base substrate; wherein the pixel circuit at least comprises a drive transistor, the drive transistor comprising a gate electrode, a first electrode, and a second electrode; and the pixel electrode at least comprises a reflective electrode;

wherein the plurality of pixel electrodes are electrically connected to the plurality of pixel circuits in one-to-one correspondence, and an orthographic projection of at least one of the pixel circuits on the base substrate is within an orthographic projection of a pixel electrode corresponding to the pixel electrode on the base substrate; and the pixel electrode is configured to reflect light transmitted by the liquid crystal layer to the liquid crystal layer, such that the light is exited from a side, distal from the base substrate, of the liquid crystal layer; and the display module further comprises a first planarization layer and a protrusion layer, disposed between the reflective electrode and the pixel electrode, and successively arranged along the direction away from the base substrate, wherein a side, distal from the base substrate, of the protrusion layer is provided with a plurality of protrusions.

* * * * *